(12) United States Patent
Hsueh et al.

(10) Patent No.: US 12,271,053 B2
(45) Date of Patent: Apr. 8, 2025

(54) IMAGE CAPTURING OPTICAL SYSTEM, IMAGE CAPTURING UNIT AND ELECTRONIC DEVICE

(71) Applicant: LARGAN PRECISION CO., LTD., Taichung (TW)

(72) Inventors: Chun-Che Hsueh, Taichung (TW); Chun-Yen Chen, Taichung (TW); Meng-Kuan Cho, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 569 days.

(21) Appl. No.: 17/667,113

(22) Filed: Feb. 8, 2022

(65) Prior Publication Data
US 2023/0194835 A1 Jun. 22, 2023

(30) Foreign Application Priority Data
Dec. 17, 2021 (TW) .................. 110147519

(51) Int. Cl.
*G02B 9/58* (2006.01)
*G02B 9/34* (2006.01)
*G02B 13/00* (2006.01)

(52) U.S. Cl.
CPC ............. *G02B 9/58* (2013.01); *G02B 9/34* (2013.01); *G02B 13/004* (2013.01)

(58) Field of Classification Search
CPC ............. G02B 9/58; G02B 13/00; G02B 9/34
USPC .................................................. 359/782, 783
See application file for complete search history.

(56) References Cited

U.S. PATENT DOCUMENTS

| 4,380,374 | A | 4/1983 | Vanderwerf |
| 11,125,972 | B2 | 9/2021 | Chen et al. |
| 2015/0029385 | A1 | 1/2015 | Lee |
| 2015/0185439 | A1* | 7/2015 | Gong ............... G02B 9/34 |
| | | | 348/373 |
| 2016/0116708 | A1 | 4/2016 | Chen et al. |
| 2016/0161706 | A1 | 6/2016 | Liao |
| 2017/0293108 | A1* | 10/2017 | Liao ............... G02B 9/34 |

(Continued)

FOREIGN PATENT DOCUMENTS

| CN | 201910137596 | A | 4/2019 |
| CN | 202011010759 | A | 12/2020 |

(Continued)

OTHER PUBLICATIONS

European Search Report in Application No. 22168715.5 Dated Oct. 14, 2022.

*Primary Examiner* — George G. King
(74) *Attorney, Agent, or Firm* — Maschoff Brennan

(57) ABSTRACT

An image capturing optical system includes four lens elements which are, in order from an object side to an image side along an optical path: a first lens element, a second lens element, a third lens element and a fourth lens element. The first lens element with negative refractive power has an image-side surface being concave in a paraxial region thereof. The second lens element has positive refractive power. The third lens element with positive refractive power has an object-side surface being concave in a paraxial region thereof and an image-side surface being convex in a paraxial region thereof. The image capturing optical system further includes an aperture stop located between the second lens element and the third lens element.

27 Claims, 32 Drawing Sheets

(56) References Cited

U.S. PATENT DOCUMENTS

| | | | |
|---|---|---|---|
| 2019/0101724 A1* | 4/2019 | Chen | G02B 13/14 |
| 2019/0107689 A1 | 4/2019 | Huang | |
| 2019/0121106 A1 | 4/2019 | Yang | |
| 2019/0285848 A1* | 9/2019 | Hsieh | G02B 13/004 |
| 2020/0209524 A1* | 7/2020 | Chen | G02B 9/34 |
| 2021/0026107 A1 | 1/2021 | He et al. | |
| 2022/0326485 A1 | 10/2022 | Ikemori et al. | |

FOREIGN PATENT DOCUMENTS

| | | |
|---|---|---|
| CN | 202110299756 A | 4/2021 |
| CN | 202022780398 A | 6/2021 |
| CN | 114624855 A | 6/2022 |
| EP | 0529646 A1 | 3/1993 |
| IN | 202011621476 A | 4/2021 |
| JP | H09-068648 A | 3/1997 |
| JP | 2006-309043 A | 11/2006 |
| JP | 2007-322656 A | 12/2007 |
| TW | 106102867 A | 8/2018 |
| WO | 2012090729 A1 | 7/2012 |
| WO | 2012105181 A1 | 8/2012 |
| WO | 2021082223 A1 | 5/2021 |
| WO | 2021114458 A1 | 6/2021 |

\* cited by examiner

IMAGE CAPTURING OPTICAL SYSTEM, IMAGE CAPTURING UNIT AND ELECTRONIC DEVICE

RELATED APPLICATIONS

This application claims priority to Taiwan Application 110147519, filed on Dec. 17, 2021, which is incorporated by reference herein in its entirety.

BACKGROUND

Technical Field

The present disclosure relates to an image capturing optical system, an image capturing unit and an electronic device, more particularly to an image capturing optical system and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an image capturing optical system includes four lens elements. The four lens elements are, in order from an object side to an image side along an optical path, a first lens element, a second lens element, a third lens element and a fourth lens element. Each of the four lens elements has an object-side surface facing toward the object side and an image-side surface facing toward the image side.

The first lens element has negative refractive power, and the image-side surface of the first lens element is concave in a paraxial region thereof. The second lens element has positive refractive power. The third lens element has positive refractive power, the object-side surface of the third lens element is concave in a paraxial region thereof, and the image-side surface of the third lens element is convex in a paraxial region thereof. The fourth lens element has negative refractive power, the object-side surface of the fourth lens element is convex in a paraxial region thereof, and the image-side surface of the fourth lens element is concave in a paraxial region thereof. There is an air gap in a paraxial region between the second lens element and the third lens element. The image capturing optical system further comprises an aperture stop located between the second lens element and the third lens element.

When a curvature radius of the object-side surface of the second lens element is R3, a curvature radius of the image-side surface of the second lens element is R4, a focal length of the image capturing optical system is f, a central thickness of the second lens element is CT2, and a central thickness of the third lens element is CT3, the following conditions are satisfied:

$$-1.65<(R3+R4)/(R3-R4); \text{ and}$$

$$0.60<f/(CT2+CT3)<2.50.$$

According to another aspect of the present disclosure, an image capturing optical system includes four lens elements. The four lens elements are, in order from an object side to an image side along an optical path, a first lens element, a second lens element, a third lens element and a fourth lens element. Each of the four lens elements has an object-side surface facing toward the object side and an image-side surface facing toward the image side.

The first lens element has negative refractive power, and the image-side surface of the first lens element is concave in a paraxial region thereof. The second lens element has positive refractive power. The third lens element has positive refractive power, the object-side surface of the third lens element is concave in a paraxial region thereof, and the image-side surface of the third lens element is convex in a paraxial region thereof. The fourth lens element has negative refractive power, the object-side surface of the fourth lens element is convex in a paraxial region thereof, the image-side surface of the fourth lens element is concave in a paraxial region thereof, and at least one of the object-side surface and the image-side surface of the fourth lens element has at least one inflection point. There is an air gap in a paraxial region between the second lens element and the third lens element. The image capturing optical system further includes an aperture stop located between the second lens element and the third lens element.

When a curvature radius of the object-side surface of the second lens element is R3, and a curvature radius of the image-side surface of the second lens element is R4, the following condition is satisfied:

$$-1.40<(R3+R4)/(R3-R4)<0.80.$$

According to another aspect of the present disclosure, an image capturing optical system includes four lens elements. The four lens elements are, in order from an object side to an image side along an optical path, a first lens element, a second lens element, a third lens element and a fourth lens element. Each of the four lens elements has an object-side surface facing toward the object side and an image-side surface facing toward the image side.

The first lens element has negative refractive power, and the image-side surface of the first lens element is concave in a paraxial region thereof. The second lens element has positive refractive power. The third lens element has positive refractive power, the object-side surface of the third lens element is concave in a paraxial region thereof, and the image-side surface of the third lens element is convex in a paraxial region thereof. The image capturing optical system further includes an aperture stop located between the second lens element and the third lens element.

When a curvature radius of the object-side surface of the second lens element is R3, a curvature radius of the image-side surface of the second lens element is R4, a curvature radius of the object-side surface of the fourth lens element is R7, a curvature radius of the image-side surface of the fourth lens element is R8, a focal length of the image capturing optical system is f, a central thickness of the second lens element is CT2, a central thickness of the third lens element is CT3, a central thickness of the fourth lens element is CT4, an f-number of the image capturing optical system is Fno, and an axial distance between the object-side surface of the first lens element and the image-side surface of the fourth lens element is TD, the following conditions are satisfied:

$-2.40<(R3+R4)/(R3-R4)<15.0;$ $-0.85<(R7+R8)/(R7-R8);$ $0.60<f/(CT2+CT3)<1.52;$ $1.40<Fno<2.50;$ and $5.00<TD/CT4<22.0.$ According to another aspect of the present disclosure, an image capturing unit includes one of the aforementioned image capturing optical systems and an image sensor, wherein the image sensor is disposed on an image surface of the image capturing optical system.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An image capturing optical system includes four lens elements. The four lens elements are, in order from an object side to an image side along an optical path, a first lens element, a second lens element, a third lens element and a fourth lens element. Each of the four lens elements has an object-side surface facing toward the object side and an image-side surface facing toward the image side.

The first lens element has negative refractive power. Therefore, it is favorable for reducing the size of the first lens element and the second lens element of the image capturing optical system. The image-side surface of the first lens element is concave in a paraxial region thereof. Therefore, it is favorable for adjusting the lens shape of the first lens element, thereby correcting aberrations such as astigmatism.

The second lens element has positive refractive power. Therefore, it is favorable for combining the second lens element with the first lens element so to as correct aberrations such as spherical aberration.

The third lens element has positive refractive power. Therefore, it is favorable for combining the third lens element with the fourth lens element so as to correct coma at the adjacent field of view. The object-side surface of the third lens element is concave in a paraxial region thereof. Therefore, it is favorable for adjusting the travelling direction of light, thereby balancing the size distribution of the image capturing optical system. The image-side surface of the third lens element is convex in a paraxial region thereof. Therefore, it is favorable for adjusting the lens shape of the third lens element, thereby correcting aberrations such as spherical aberration.

The fourth lens element can have negative refractive power. Therefore, it is favorable for reducing the size of the third lens element and the fourth lens element of the image capturing optical system. The object-side surface of the fourth lens element can be convex in a paraxial region thereof. Therefore, it is favorable for adjusting the travelling direction of light, thereby increasing the size of the image surface. The image-side surface of the fourth lens element can be concave in a paraxial region thereof. Therefore, it is favorable for adjusting the lens shape on the image-side surface of the fourth lens element, thereby reducing the back focal length.

Figure 29:
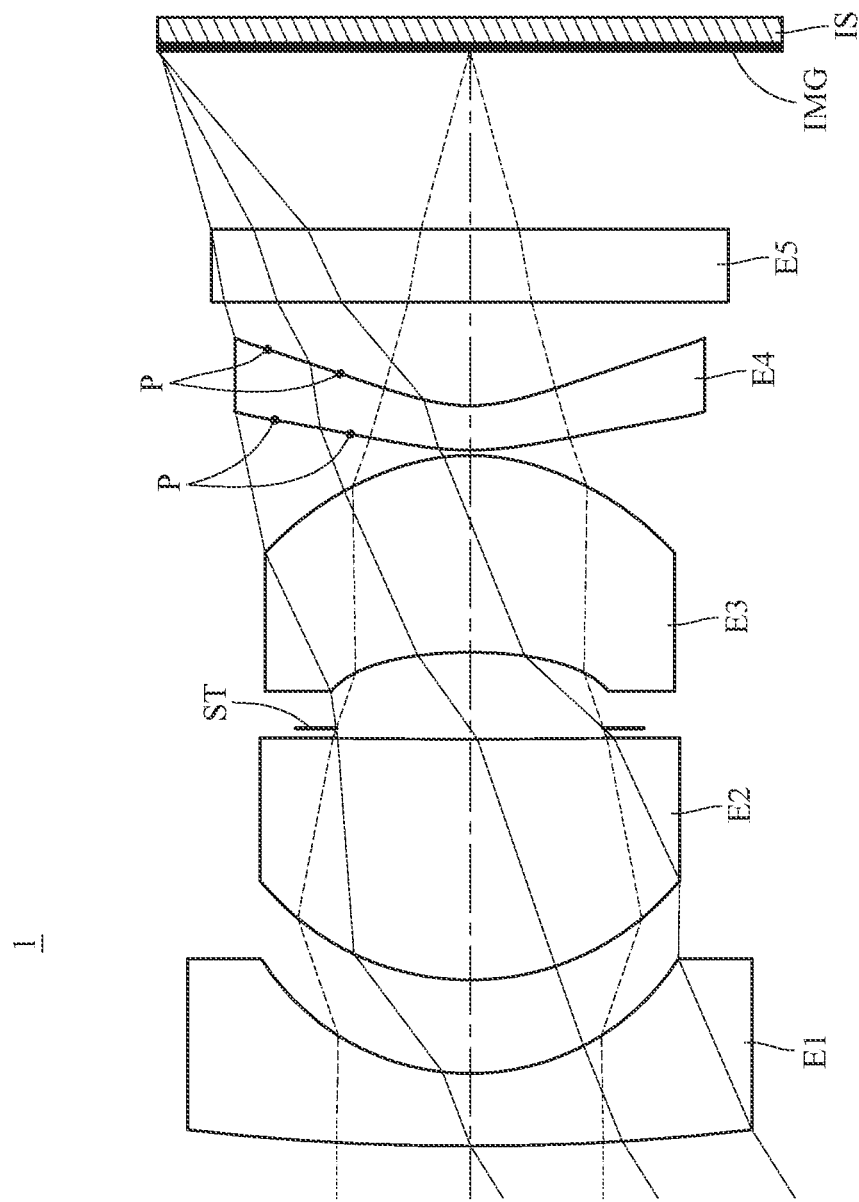
FIG. 29 shows a schematic view of inflection points of the fourth lens element according to the 1st embodiment of the present disclosure.

At least one of the object-side surface and the image-side surface of the fourth lens element can have at least one inflection point. Therefore, it is favorable for adjusting the incident angle on the image surface, thereby reducing the influence of temperature changes on the size of light spot at the peripheral field of view. Please refer to FIG. 29, which shows a schematic view of inflection points P of the object-side surface and the image-side surface of the fourth lens element E4 according to the 1st embodiment of the present disclosure. The abovementioned inflection points on the fourth lens element in FIG. 29 are only exemplary. Each of lens surfaces in various embodiments of the present disclosure may also have one or more inflection points.

According to the present disclosure, the image capturing optical system further includes an aperture stop located between the second lens element and the third lens element. Therefore, it is favorable for adjusting the position of the aperture stop in the image capturing optical system, thereby increasing the field of view and the size of the aperture.

According to the present disclosure, there can be an air gap in a paraxial region between the second lens element and the third lens element; that is, each of the second through third lens elements can be a single and non-cemented lens element. Therefore, it is favorable for adjusting the relative positions of the second lens element and the third lens element, thereby reducing the difficulty in the lens manufacturing and assembly. The manufacturing process of cemented lenses is more complex than the non-cemented lenses, particularly when an image-side surface of one lens element and an object-side surface of the following lens element need to have accurate curvatures to ensure both lenses being properly cemented. In addition, during the cementing process, those two lens elements might not be well cemented due to misalignment, which is not favorable for the image quality. Therefore, having an air gap in a paraxial region between adjacent lens elements of the image capturing optical system in the present disclosure is favorable for preventing the problems of the cemented lens elements so as to improve the yield rate and to increase flexibility in designing the surface shapes of lens elements, thereby reducing the size of the image capturing optical system and correcting aberrations.

When a curvature radius of the object-side surface of the second lens element is R3, and a curvature radius of the image-side surface of the second lens element is R4, the following condition is satisfied: $-1.65<(R3+R4)/(R3-R4)$. Therefore, it is favorable for adjusting the lens shape and the refractive power of the second lens element, thereby reducing the effective radius of the second lens element. Moreover, the following condition can also be satisfied: $-2.40<(R3+R4)/(R3-R4)<15.0$. Moreover, the following condition can also be satisfied: $-1.50<(R3+R4)/(R3-R4)<4.00$. Moreover, the following condition can also be satisfied: $-1.40<(R3+R4)/(R3-R4)<0.80$.

When a focal length of the image capturing optical system is f, a central thickness of the second lens element is CT2, and a central thickness of the third lens element is CT3, the following condition can be satisfied: $0.60<f/(CT2+CT3)<2.50$. Therefore, it is favorable for adjusting the ratio of the sum of the thicknesses of the second and third lens elements to the focal length of the image capturing optical system, thereby obtaining a proper balance between increasing in the image height and reduction in the total track length of the image capturing optical system. Moreover, the following condition can also be satisfied: $0.60<f/(CT2+CT3)<1.52$.

When a curvature radius of the object-side surface of the fourth lens element is R7, and a curvature radius of the image-side surface of the fourth lens element is R8, the following condition can be satisfied: $-0.85<(R7+R8)/(R7-R8)$. Therefore, it is favorable for adjusting the lens shape and the refractive power of the fourth lens element, thereby reducing the back focal length. Moreover, the following condition can also be satisfied: $-0.30<(R7+R8)/(R7-R8)<8.00$.

When an f-number of the image capturing optical system is Fno, the following condition can be satisfied: $1.40<Fno<2.50$. Therefore, it is favorable for adjusting the ratio of the size of the aperture and the focal length, thereby increasing the amount of incident light into the image capturing optical system and obtaining good image quality even in the dark. Moreover, the following condition can also be satisfied: $1.50<Fno<2.40$. Moreover, the following condition can also be satisfied: $1.50<Fno<2.30$. Moreover, the following condition can also be satisfied: $1.60<Fno<2.25$.

When an axial distance between the object-side surface of the first lens element and the image-side surface of the fourth lens element is TD, and a central thickness of the fourth lens element is CT4, the following condition can be satisfied: $5.00<TD/CT4<22.0$. Therefore, it is favorable for adjusting the ratio of the distance between the object-side surface of the first lens element and the image-side surface of the fourth lens element to the thickness of the fourth lens element, thereby obtaining a proper balance between small manufacturing variation and less temperature effect. Moreover, the following condition can also be satisfied: $6.50<TD/CT4<20.0$. Moreover, the following condition can also be satisfied: $5.00<TD/CT4<18.5$.

When an axial distance between the third lens element and the fourth lens element is T34, and a sum of axial distances between each of all adjacent lens elements of the image capturing optical system is ΣAT, the following condition can be satisfied: $0<T34/\Sigma AT<0.10$. Therefore, it is favorable for adjusting the distances of lens elements among the image capturing optical system, thereby reducing the size of the image capturing optical system.

When the curvature radius of the object-side surface of the second lens element is R3, and a curvature radius of the object-side surface of the third lens element is R5, the following condition can be satisfied: $-0.38<(R3+R5)/(R3-R5)<0.27$. Therefore, it is favorable for adjusting the lens shapes of the object-side surface of the second lens element and the object-side surface of the third lens element, thereby reducing spherical aberration at the central field of view.

When the focal length of the image capturing optical system is f, and a focal length of the second lens element is f2, the following condition can be satisfied: $0.65<f/f2<2.50$. Therefore, it is favorable for adjusting the refractive power of the second lens element, thereby reducing the size of light spot at the central field of view. Moreover, the following condition can also be satisfied: $0.65<f/f2<2.00$.

When the focal length of the image capturing optical system is f, and the curvature radius of the object-side surface of the second lens element is R3, the following condition can be satisfied: $0.70<f/R3<2.00$. Therefore, it is favorable for adjusting the ratio of the curvature radius of the object-side surface of the second lens element to the focal length of the image capturing optical system, thereby reducing the size of the image capturing optical system and correcting aberrations.

When the curvature radius of the object-side surface of the second lens element is R3, and a curvature radius of the image-side surface of the third lens element is R6, the following condition can be satisfied: $0.10<(R3+R6)/(R3-R6)<0.65$. Therefore, it is favorable for adjusting the lens shapes of the object-side surface of the second lens element and the image-side surface of the third lens element, thereby increasing light convergence quality at the central and peripheral fields of view.

When the axial distance between the object-side surface of the first lens element and the image-side surface of the fourth lens element is TD, and an axial distance between the aperture stop and an image surface is SL, the following condition can be satisfied: $0.40<TD/SL<1.50$. Therefore, it is favorable for adjusting the ratio of the distance between the object-side surface of the first lens element and the image-side surface of the fourth lens element to the distance between the aperture stop and the image surface, thereby reducing the size of the image capturing optical system. Moreover, the following condition can also be satisfied: $0.60<TD/SL<1.30$. Moreover, the following condition can also be satisfied: $0.65<TD/SL<1.30$.

When the focal length of the image capturing optical system is f, and an axial distance between the second lens element and the third lens element is T23, the following condition can be satisfied: $2.50<f/T23<15.0$. Therefore, it is favorable for adjusting the ratio of the focal length of the image capturing optical system to the distance between the second lens element and the third lens element, thereby properly distributing the size of the image capturing optical system and reducing assembly error.

When an axial distance between the object-side surface of the second lens element and the aperture stop is Dr3s, and an axial distance between the image-side surface of the second lens element and the aperture stop is Dr4s, the following condition can be satisfied: $-0.80<Dr4s/Dr3s<1.00$. Therefore, it is favorable for adjusting the relative positions of the second lens element and the aperture stop, thereby increasing the size of the aperture and the relative illuminance at the peripheral field of view.

When an axial distance between the object-side surface of the third lens element and the aperture stop is Dr5s, and an axial distance between the image-side surface of the third lens element and the aperture stop is Dr6s, the following condition can be satisfied: $-0.80<Dr5s/Dr6s<1.00$. Therefore, it is favorable for adjusting the relative positions of the third lens element and the aperture stop, thereby reducing influence of the temperature effect on the relative illuminance at the peripheral field of view. Note that the value of Dr3s, Dr4s, Dr5s, or Dr6s is positive when being defined in a direction from the object side to the image side and is negative when being defined in a direction from the image side to the object side. For example, if the aperture stop is located between the first lens element and the second lens element, Dr3s, Dr4s, Dr5s, and Dr6s are negative; if the aperture stop is located between the second lens element and the third lens element, Dr3s and Dr4s are positive, while Dr5s and Dr6s are negative; and if the aperture stop is located between the third lens element and the fourth lens element, Dr3s, Dr4s, Dr5s, and Dr6s are positive.

When the focal length of the image capturing optical system is f, and a composite focal length of the second lens element and the third lens element is f23, the following condition can be satisfied: $0.60<f/f23<1.80$. Therefore, it is favorable for adjusting the overall refractive power from the second lens element to the third lens element, thereby correcting astigmatism of aberrations.

When the focal length of the image capturing optical system is f, and a curvature radius of the object-side surface of the first lens element is R1, the following condition can be satisfied: $-0.30<f/R1<0.50$. Therefore, it is favorable for adjusting the ratio of the focal length of the image capturing optical system to the curvature radius of the object-side surface of the first lens element, thereby increasing the field of view. Moreover, the following condition can also be satisfied: $-0.20<f/R1<0.34$.

When the axial distance between the second lens element and the third lens element is T23, and the axial distance between the third lens element and the fourth lens element is T34, the following condition can be satisfied: $11.0<T23/T34<19.0$. Therefore, it is favorable for adjusting the ratio of the lens distance between the second and third lens elements to the lens distance between the third and fourth lens elements, thereby adjusting the distribution of lens elements and balancing the size distribution of the image capturing optical system.

When the focal length of the image capturing optical system is f, the axial distance between the second lens element and the third lens element is T23, and the axial distance between the third lens element and the fourth lens element is T34, the following condition can be satisfied: $2.00<f/(T23+T34)<6.20$. Therefore, it is favorable for adjusting the ratio of the focal length of the image capturing optical system to the sum of the lens distances among the second through fourth lens elements, thereby reducing the possibility of impact and increasing assembly yield rate.

When a refractive index of the first lens element is N1, and a refractive index of the second lens element is N2, the following condition can be satisfied: $1.63<(N1+N2)/2<1.83$. Therefore, it is favorable for adjusting the average value of the refractive indices of the first and second lens elements, thereby reducing the image height and the field of view.

When the focal length of the image capturing optical system is f, an axial distance between the first lens element and the second lens element is T12, and the axial distance between the second lens element and the third lens element is T23, the following condition can be satisfied: $0.55<f/(T12+T23)<2.85$. Therefore, it is favorable for adjusting the ratio of the focal length of the image capturing optical system to the sum of the lens distances among the first through third lens elements, thereby reducing focal length variation due to temperature changes.

According to the present disclosure, the aforementioned features and conditions can be utilized in numerous combinations so as to achieve corresponding effects.

According to the present disclosure, the lens elements of the image capturing optical system can be made of either glass or plastic material. When the lens elements are made of glass material, the refractive power distribution of the image capturing optical system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the image capturing optical system can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the image capturing optical system, based on the corresponding image sensor, can be flat or curved, especially a curved surface being concave facing towards the object side of the image capturing optical system.

According to the present disclosure, an image correction unit, such as a field flattener, can be optionally disposed between the lens element closest to the image side of the image capturing optical system along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 30:
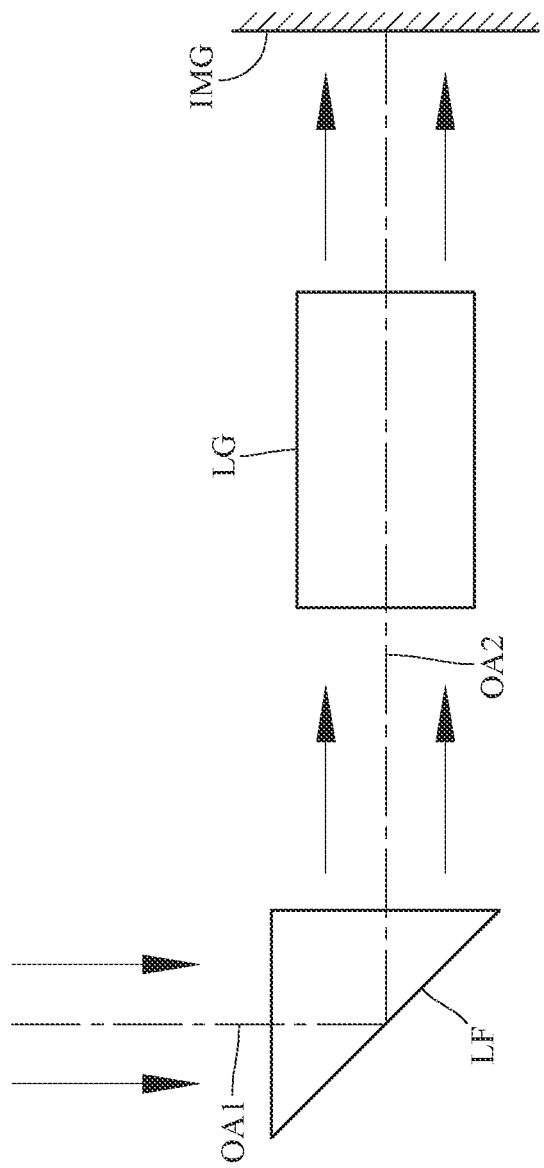
FIG. 30 shows a schematic view of a configuration of a light-folding element in an image capturing optical system according to one embodiment of the present disclosure.
Figure 31:
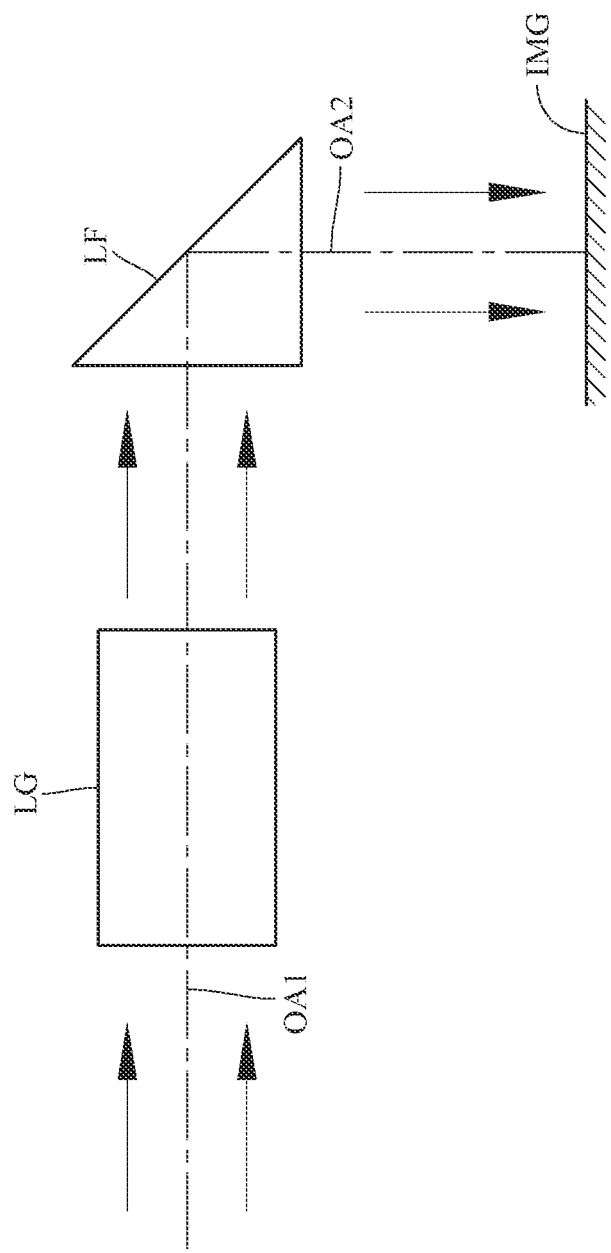
FIG. 31 shows a schematic view of another configuration of a light-folding element in an image capturing optical system according to one embodiment of the present disclosure.
Figure 32:
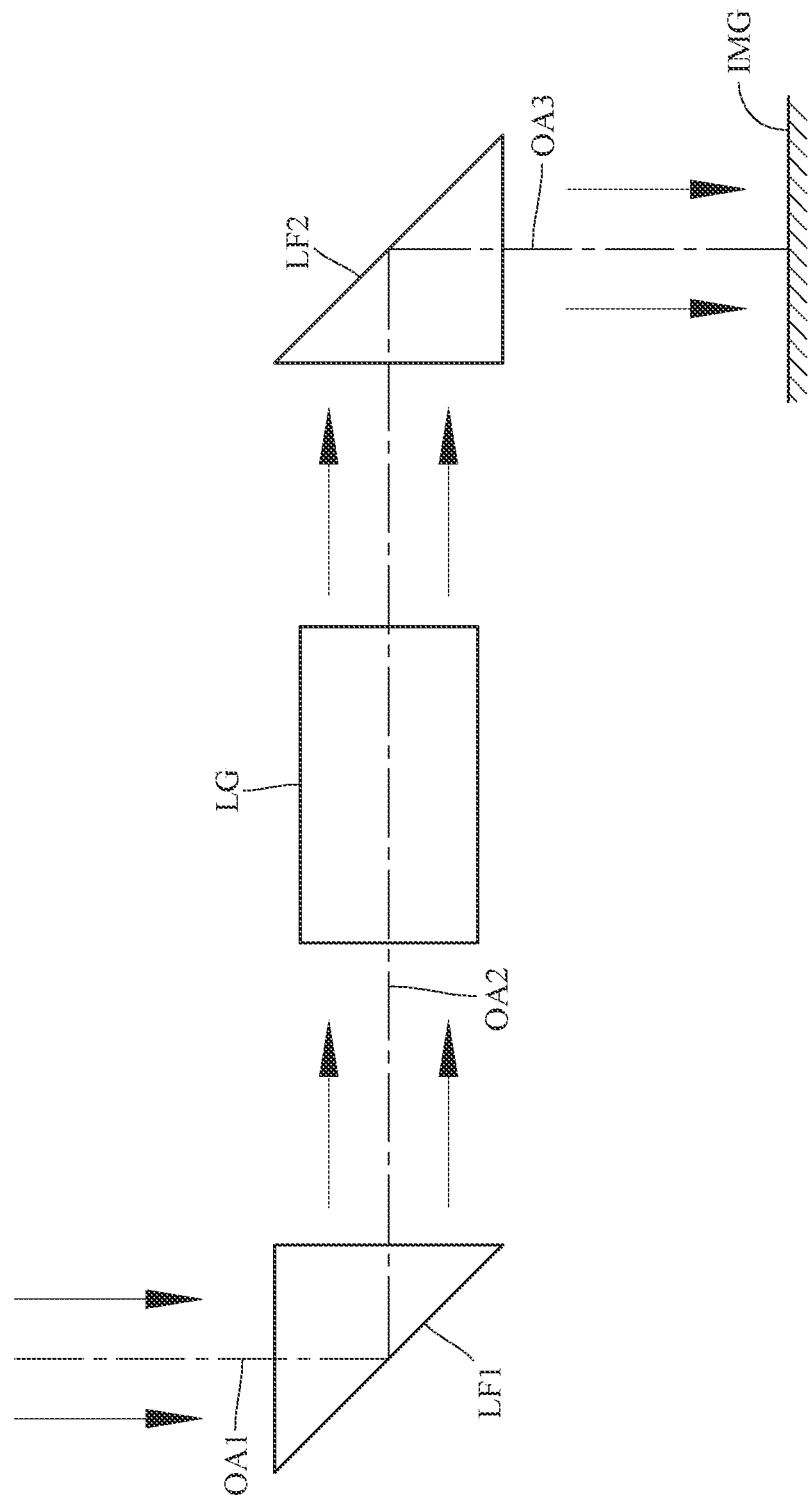
FIG. 32 shows a schematic view of a configuration of two light-folding elements in an image capturing optical system according to one embodiment of the present disclosure.

According to the present disclosure, at least one light-folding element, such as a prism or a mirror, can be optionally disposed between an imaged object and the image surface on the imaging optical path, such that the image capturing optical system can be more flexible in space arrangement, and therefore the dimensions of an electronic device is not restricted by the total track length of the image capturing optical system. Specifically, please refer to FIG. 30 and FIG. 31. FIG. shows a schematic view of a configuration of a light-folding element in an image capturing optical system according to one embodiment of the present disclosure, and FIG. 31 shows a schematic view of another configuration of a light-folding element in an image capturing optical system according to one embodiment of the present disclosure. In FIG. 30 and FIG. 31, the image capturing optical system can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the image capturing optical system as shown in FIG. 30 or disposed between a lens group LG of the image capturing optical system and the image surface IMG as shown in FIG. 31. Furthermore, please refer to FIG. 32, which shows a schematic view of a configuration of two light-folding elements in an image capturing optical system according to one embodiment of the present disclosure. In FIG. 32, the image capturing optical system can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the image capturing optical system, the second light-folding element LF2 is disposed between the lens group LG of the image capturing optical system and the image surface IMG, and the travelling direction of light on the first optical axis OA1 can be the same direction as the travelling direction of light on the third optical axis OA3 as shown in FIG. 32. The image capturing optical system can be optionally provided with three or more light-folding elements, and the present disclosure is not limited to the type, amount and position of the light-folding elements of the embodiments disclosed in the aforementioned figures.

According to the present disclosure, the image capturing optical system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the image capturing optical system and the image surface to produce a telecentric effect, and thereby improves the image-sensing efficiency of an image sensor (for example, CCD or CMOS). A middle stop disposed between the first lens element and the image surface is favorable for enlarging the viewing angle of the image capturing optical system and thereby provides a wider field of view for the same.

According to the present disclosure, the image capturing optical system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
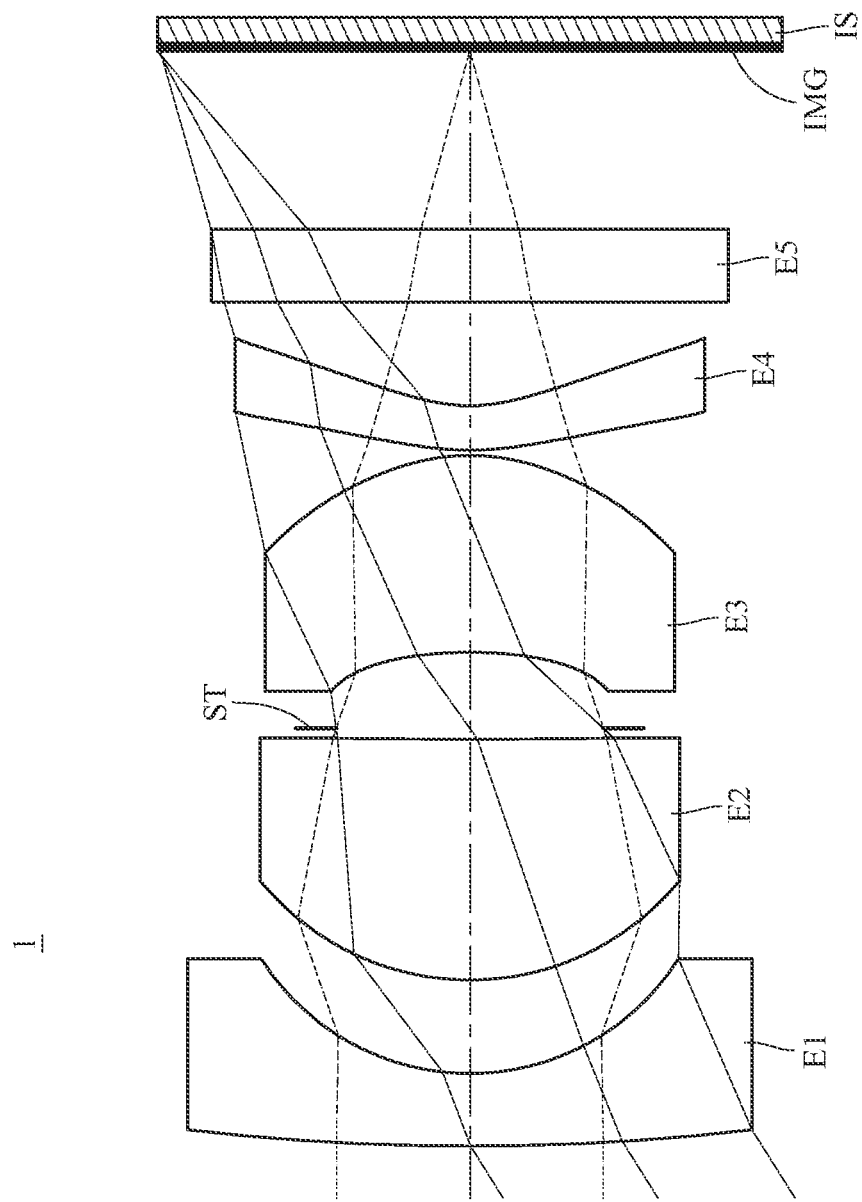
FIG. 1 is a schematic view of an image capturing unit according to the 1st embodiment of the present disclosure.
Figure 2:
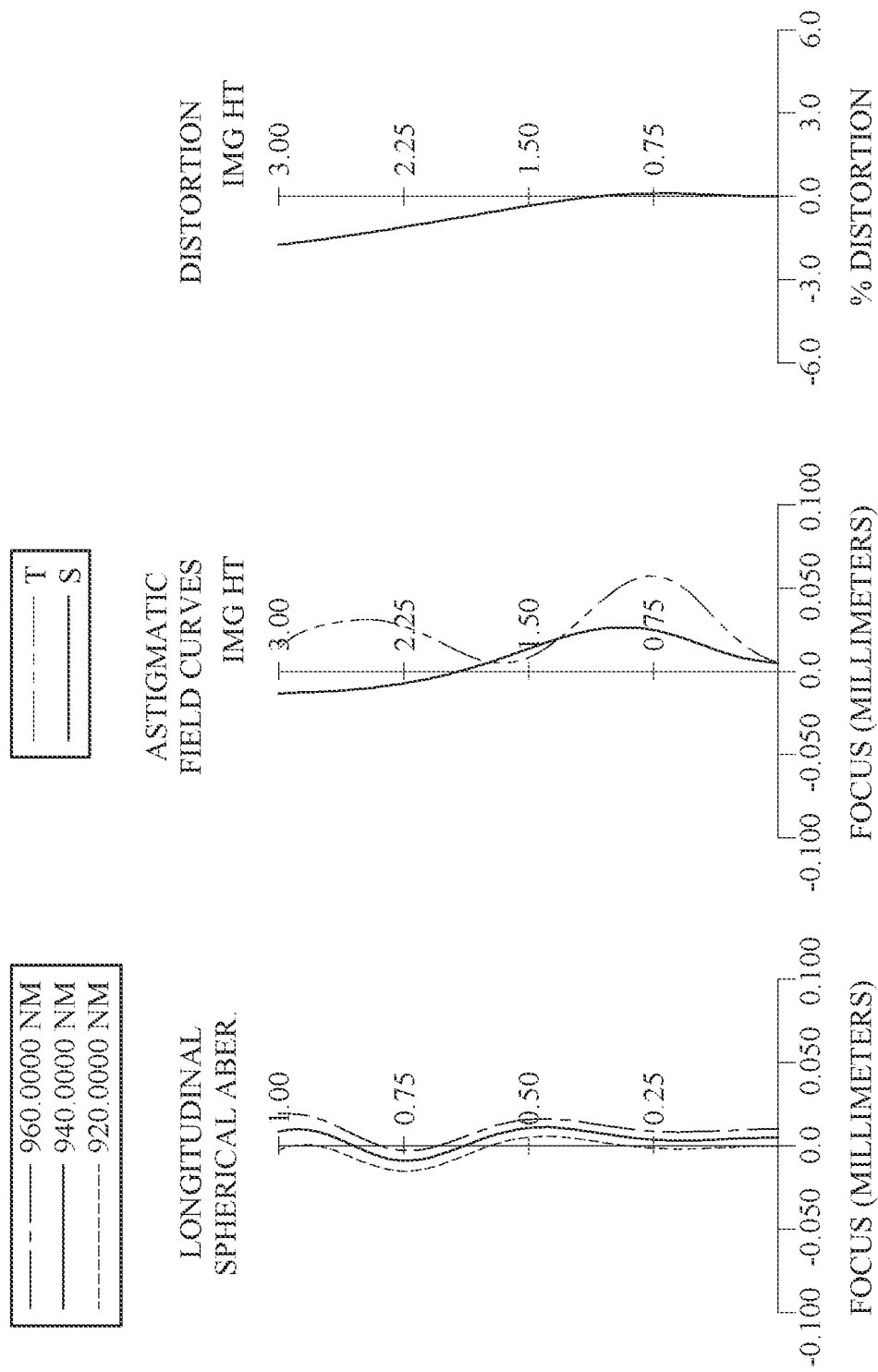
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the image capturing optical system (its reference numeral is omitted) of the present disclosure and an image sensor IS. The image capturing optical system includes, in order from an object side to an image side along an optical axis, a first lens element E1, a second lens element E2, an aperture stop ST, a third lens element E3, a fourth lens element E4, a filter E5 and an image surface IMG. The image capturing optical system includes four lens elements (E1, E2, E3 and E4) with no additional lens element disposed between each of the adjacent four lens elements, wherein there is an air gap in a paraxial region between the second lens element E2 and the third lens element E3.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with positive refractive power has an object-side surface being convex in a paraxial region thereof and an image-side surface being concave in a paraxial region thereof. The second lens element E2 is made of glass material and has the object-side surface and the image-side surface being both spherical.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric. The image-side surface of the third lens element E3 has one inflection point.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points.

The filter E5 is made of glass material and located between the fourth lens element E4 and the image surface IMG, and will not affect the focal length of the image capturing optical system. The image sensor IS is disposed on or near the image surface IMG of the image capturing optical system.

The equation of the aspheric surface profiles of the aforementioned lens elements of the 1st embodiment is expressed as follows:

$$X(Y) = (Y^2/R) / (1+\text{sqrt}(1-(1+k)\times(Y/R)^2)) + \sum_i (Ai)\times(Y^i),$$

where,

X is the displacement in parallel with an optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the image capturing optical system of the image capturing unit according to the 1st embodiment, when a focal length of the image capturing optical system is f, a focal length of the image capturing optical system at the wavelength of helium d-line is fd, an f-number of the image capturing optical system is Fno, and half of a maximum field of view of the image capturing optical system is HFOV, these parameters have the following values: f=4.86 millimeters (mm), fd=4.66 mm, Fno=1.89, HFOV=32.2 degrees (deg.).

When a refractive index of the first lens element E1 is N1, and a refractive index of the second lens element E2 is N2, the following condition is satisfied: (N1+N2)/2=1.65.

When a curvature radius of the object-side surface of the second lens element E2 is R3, and a curvature radius of the image-side surface of the second lens element E2 is R4, the following condition is satisfied: (R3+R4)/(R3−R4)=−1.06.

When the curvature radius of the object-side surface of the second lens element E2 is R3, and a curvature radius of the object-side surface of the third lens element E3 is R5, the following condition is satisfied: (R3+R5)/(R3−R5)=−0.23.

When the curvature radius of the object-side surface of the second lens element E2 is R3, and a curvature radius of the image-side surface of the third lens element E3 is R6, the following condition is satisfied: (R3+R6)/(R3−R6)=0.14.

When a curvature radius of the object-side surface of the fourth lens element E4 is R7, and a curvature radius of the image-side surface of the fourth lens element E4 is R8, the following condition is satisfied: (R7+R8)/(R7−R8)=3.81.

When an axial distance between the object-side surface of the second lens element E2 and the aperture stop ST is Dr3s, and an axial distance between the image-side surface of the second lens element E2 and the aperture stop ST is Dr4s, the following condition is satisfied: Dr4s/Dr3s=0.04.

When an axial distance between the object-side surface of the third lens element E3 and the aperture stop ST is Dr5s, and an axial distance between the image-side surface of the third lens element E3 and the aperture stop ST is Dr6s, the following condition is satisfied: Dr5s/Dr6s=0.28.

When the focal length of the image capturing optical system is f, a central thickness of the second lens element E2 is CT2, and a central thickness of the third lens element E3 is CT3, the following condition is satisfied: f/(CT2+CT3)=1.15.

When the focal length of the image capturing optical system is f, an axial distance between the first lens element E1 and the second lens element E2 is T12, and an axial distance between the second lens element E2 and the third lens element E3 is T23, the following condition is satisfied: f/(T12+T23)=2.79. In this embodiment, an axial distance between two adjacent lens elements is a distance in a paraxial region between two adjacent lens surfaces of the two adjacent lens elements.

When the focal length of the image capturing optical system is f, the axial distance between the second lens element E2 and the third lens element E3 is T23, and an axial distance between the third lens element E3 and the fourth lens element E4 is T34, the following condition is satisfied: f/(T23+T34)=5.47.

When the focal length of the image capturing optical system is f, and a focal length of the second lens element E2 is f2, the following condition is satisfied: f/f2=1.44.

When the focal length of the image capturing optical system is f, and a composite focal length of the second lens element E2 and the third lens element E3 is f23, the following condition is satisfied: f/f23=1.30.

When the focal length of the image capturing optical system is f, and a curvature radius of the object-side surface of the first lens element E1 is R1, the following condition is satisfied: f/R1=0.21.

When the focal length of the image capturing optical system is f, and the curvature radius of the object-side surface of the second lens element E2 is R3, the following condition is satisfied: f/R3=1.86.

When the focal length of the image capturing optical system is f, and the axial distance between the second lens element E2 and the third lens element E3 is T23, the following condition is satisfied: f/T23=5.80.

When the axial distance between the second lens element E2 and the third lens element E3 is T23, and the axial distance between the third lens element E3 and the fourth lens element E4 is T34, the following condition is satisfied: T23/T34=16.76.

When the axial distance between the third lens element E3 and the fourth lens element E4 is T34, and a sum of axial distances between each of all adjacent lens elements of the image capturing optical system is ΣAT, the following condition is satisfied: T34/ΣAT=0.03. In this embodiment, ΣAT is a sum of axial distances between the first lens element E1 and the second lens element E2, the second lens element E2 and the third lens element E3, and the third lens element E3 and the fourth lens element E4.

When an axial distance between the object-side surface of the first lens element E1 and the image-side surface of the fourth lens element E4 is TD, and a central thickness of the fourth lens element E4 is CT4, the following condition is satisfied: TD/CT4=16.61.

When the axial distance between the object-side surface of the first lens element E1 and the image-side surface of the fourth lens element E4 is TD, and an axial distance between the aperture stop ST and an image surface IMG is SL, the following condition is satisfied: TD/SL=1.09.

The detailed optical data of the 1st embodiment are shown in Table 1 and the aspheric surface data are shown in Table 2 below.

TABLE 1

1st Embodiment f = 4.86 mm, Fno = 1.89, HFOV = 32.2 deg.    fd = 4.66 mm

| Surface # | | Curvature Radius | | Thickness | Material | Index | Abbe # | Focal Length | Index | Focal Length |
|---|---|---|---|---|---|---|---|---|---|---|
| 0 | Object | Plano | | Infinity | | | | | | |
| 1 | Lens 1 | 23.6058 | (SPH) | 0.700 | Glass | 1.508 | 64.2 | −5.27 | 1.517 | −5.18 |
| 2 | | 2.3808 | (SPH) | 0.902 | | | | | | |
| 3 | Lens 2 | 2.6079 | (SPH) | 2.324 | Glass | 1.787 | 46.6 | 3.37 | 1.804 | 3.30 |
| 4 | | 89.2857 | (SPH) | 0.103 | | | | | | |
| 5 | Ape. Stop | Plano | | 0.735 | | | | | | |
| 6 | Lens 3 | −4.1800 | (ASP) | 1.900 | Plastic | 1.641 | 19.5 | 4.37 | 1.669 | 4.16 |
| 7 | | −1.9761 | (ASP) | 0.050 | | | | | | |
| 8 | Lens 4 | 2.6145 | (ASP) | 0.430 | Plastic | 1.594 | 25.6 | −7.25 | 1.614 | −7.04 |
| 9 | | 1.5272 | (ASP) | 1.000 | | | | | | |
| 10 | Filter | Plano | | 0.700 | Glass | 1.508 | 64.2 | — | 1.517 | — |
| 11 | | Plano | | 1.835 | | | | | | |
| 12 | Image | Plano | | — | | | | | | |

Note:
Reference wavelength to refractive index and focal length is 940.0 nm.
Note:
Reference wavelength is 587.6 nm (d-line).

TABLE 2

Aspheric Coefficients

| Surface # | 6 | 7 | 8 | 9 |
|---|---|---|---|---|
| k= | 3.70927000E+00 | −3.84371000E+00 | −1.56867000E+01 | −5.46819000E+00 |
| A4= | −3.03515912E−04 | −2.49188249E−02 | −2.13761640E−02 | −3.26434593E−02 |
| A6= | −7.70774452E−02 | 1.13036945E−02 | 2.14441419E−02 | 2.51554262E−02 |
| A8= | 1.66351892E−01 | −7.90781350E−03 | −1.37983899E−02 | −1.31314362E−02 |
| A10= | −2.19156498E−01 | 2.79027516E−03 | 5.26535084E−03 | 4.32691142E−03 |
| A12= | 1.57740996E−01 | −4.29043639E−04 | −1.15845137E−03 | −8.50580115E−04 |

TABLE 2-continued

| Aspheric Coefficients | | | | |
|---|---|---|---|---|
| Surface # | 6 | 7 | 8 | 9 |
| A14= | −5.89056183E−02 | 1.65835761E−07 | 1.35115999E−04 | 9.02012967E−05 |
| A16= | 8.70102697E−03 | 4.79718011E−06 | −6.39813441E−06 | −3.91671513E−06 |

In Table 1, the curvature radius, the thickness and the focal length are shown in millimeters (mm). Surface numbers 0-12 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
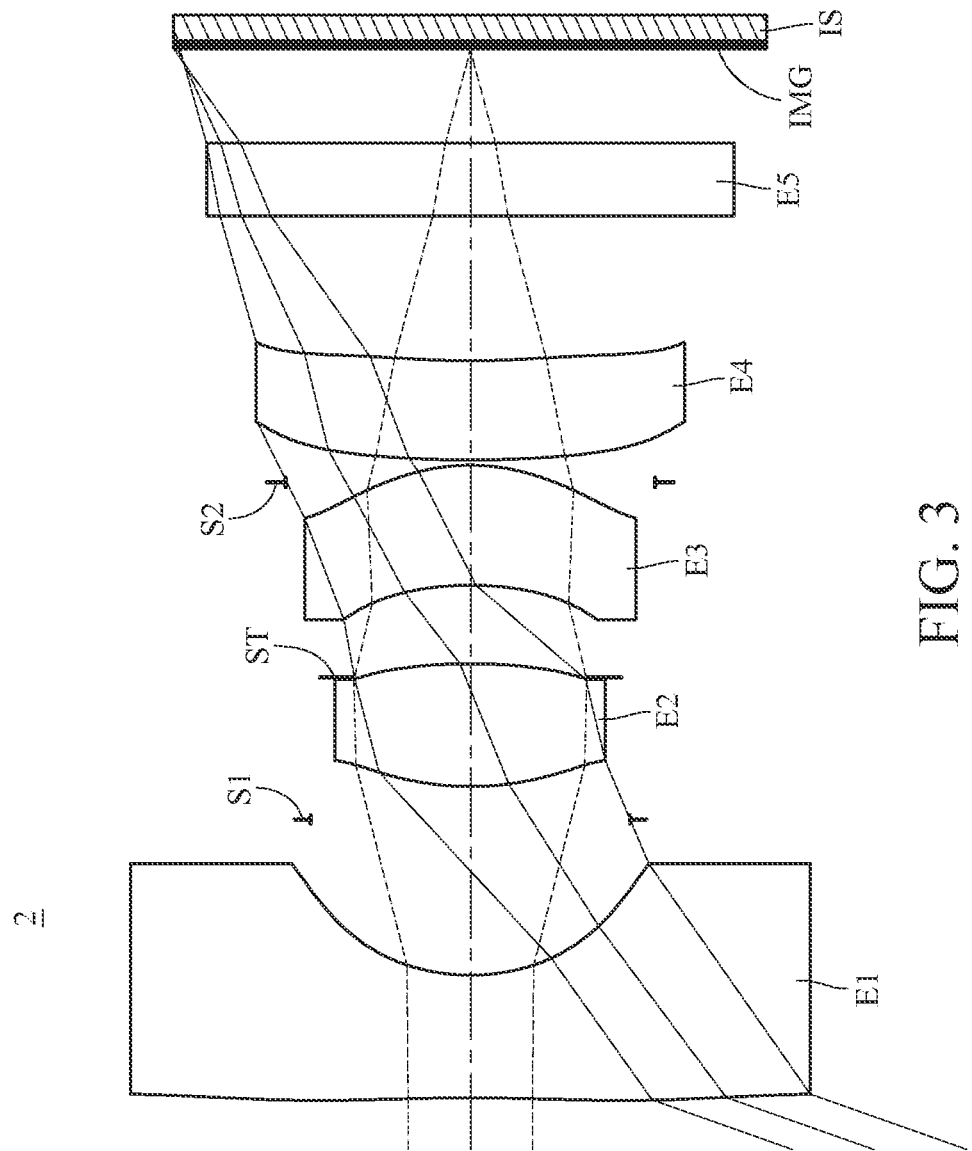
FIG. 3 is a schematic view of an image capturing unit according to the 2nd embodiment of the present disclosure.
Figure 4:
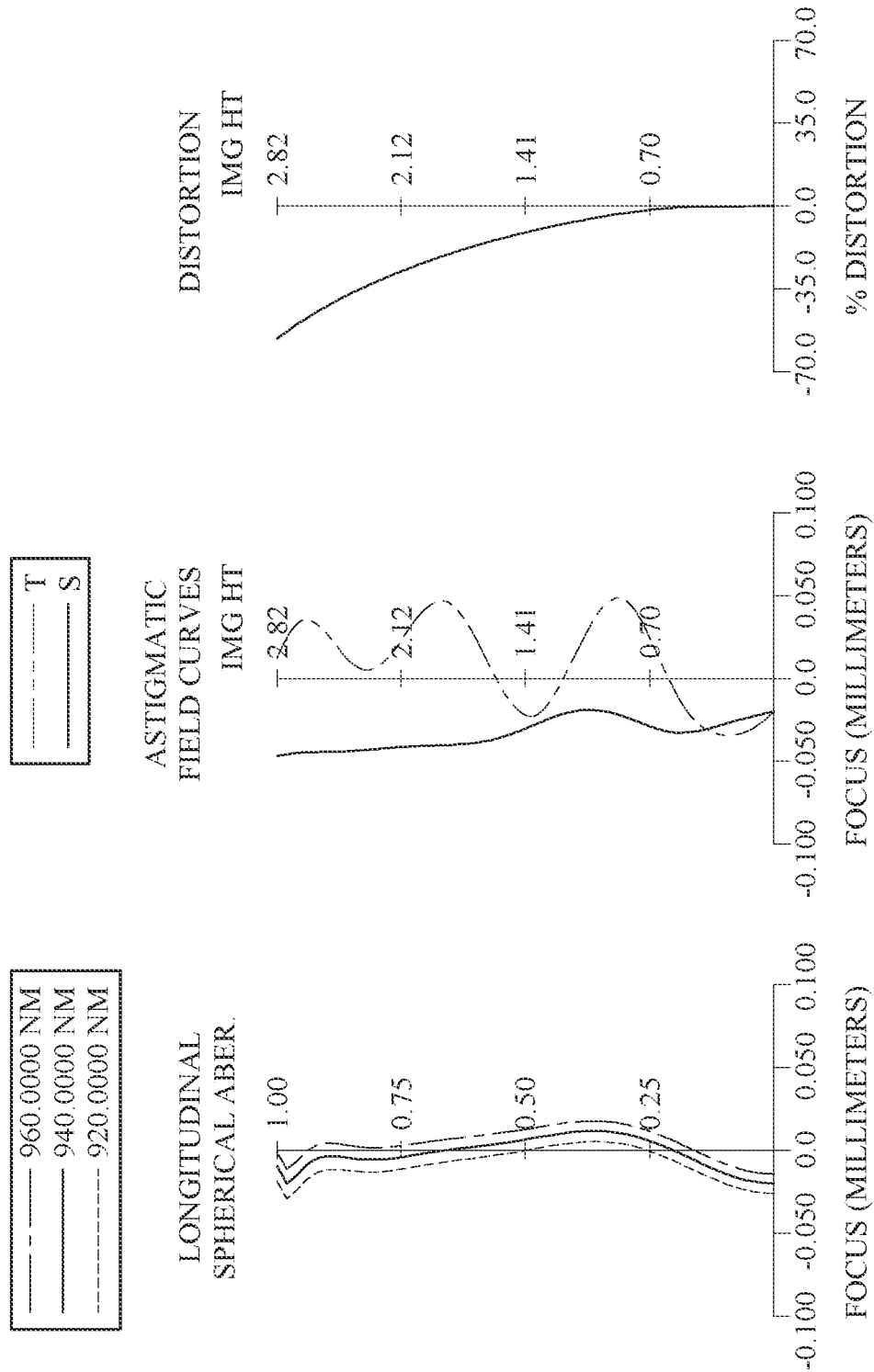
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the image capturing optical system (its reference numeral is omitted) of the present disclosure and an image sensor IS. The image capturing optical system includes, in order from an object side to an image side along an optical axis, a first lens element E1, a stop S1, a second lens element E2, an aperture stop ST, a third lens element E3, a stop S2, a fourth lens element E4, a filter E5 and an image surface IMG. The image capturing optical system includes four lens elements (E1, E2, E3 and E4) with no additional lens element disposed between each of the adjacent four lens elements, wherein there is an air gap in a paraxial region between the second lens element E2 and the third lens element E3.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has two inflection points. The image-side surface of the first lens element E1 has one inflection point. The object-side surface of the first lens element E1 has one critical point in an off-axis region thereof.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The object-side surface of the second lens element E2 has one inflection point.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric. The image-side surface of the third lens element E3 has one inflection point.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The image-side surface of the fourth lens element E4 has two inflection points.

The filter E5 is made of glass material and located between the fourth lens element E4 and the image surface IMG, and will not affect the focal length of the image capturing optical system. The image sensor IS is disposed on or near the image surface IMG of the image capturing optical system.

The detailed optical data of the 2nd embodiment are shown in Table 3 and the aspheric surface data are shown in Table 4 below.

TABLE 3

| 2nd Embodiment | | | | | | | | |
|---|---|---|---|---|---|---|---|---|
| f = 2.28 mm, Fno = 1.90, HFOV = 70.5 deg. | | | | | | | fd = 2.12 mm | |
| Surface # | | Curvature Radius | | Thickness | Material | Index | Abbe # | Focal Length | Index | Focal Length |
| 0 | Object | Plano | | Infinity | | | | | | |
| 1 | Lens 1 | −18.9195 | (ASP) | 1.184 | Plastic | 1.656 | 18.4 | −2.69 | 1.686 | −2.57 |
| 2 | | 1.9918 | (ASP) | 1.501 | | | | | | |
| 3 | Stop | Plano | | 0.319 | | | | | | |
| 4 | Lens 2 | 2.7801 | (ASP) | 1.184 | Plastic | 1.656 | 18.4 | 2.95 | 1.686 | 2.83 |
| 5 | | −5.3238 | (ASP) | −0.132 | | | | | | |
| 6 | Ape. Stop | Plano | | 0.890 | | | | | | |
| 7 | Lens 3 | −3.0755 | (ASP) | 1.158 | Plastic | 1.656 | 18.4 | 5.56 | 1.686 | 5.28 |
| 8 | | −1.9182 | (ASP) | −0.166 | | | | | | |
| 9 | Stop | Plano | | 0.216 | | | | | | |
| 10 | Lens 4 | 10.6704 | (ASP) | 0.957 | Plastic | 1.535 | 56.0 | −48.91 | 1.544 | −48.17 |
| 11 | | 7.3434 | (ASP) | 1.400 | | | | | | |
| 12 | Filter | Plano | | 0.700 | Glass | 1.508 | 64.2 | — | 1.517 | — |

TABLE 3-continued

2nd Embodiment f = 2.28 mm, Fno = 1.90, HFOV = 70.5 deg.          fd = 2.12 mm

| Surface # | Curvature Radius | Thickness | Material | Index | Abbe # | Focal Length | Focal Index | Focal Length |
|---|---|---|---|---|---|---|---|---|
| 13 | | Plano | 0.910 | | | | | |
| 14 | Image | Plano | — | | | | | |

Note:
Reference wavelength to refractive index and focal length is 940.0 nm.
An effective radius of the stop S1 (Surface 3) is 1.540 mm.
An effective radius of the stop S2 (Surface 9) is 1.780 mm.
Note:
Reference wavelength is 587.6 nm (d-line).

TABLE 4

Aspheric Coefficients

| Surface # | 1 | 2 | 4 | 5 |
|---|---|---|---|---|
| k= | −8.18008000E+01 | −7.73013000E−01 | −2.08794000E+00 | 1.21947000E+01 |
| A4= | 7.46364138E−03 | −2.31872065E−02 | 1.03964429E−02 | 1.54612083E−02 |
| A6= | 2.35777084E−05 | 2.46352244E−01 | −3.58459757E−02 | −1.01253746E−01 |
| A8= | −6.98797457E−04 | −5.77601713E−01 | 1.08764902E−01 | 3.31030936E−01 |
| A10= | 2.68514315E−04 | 8.40277480E−01 | −1.90155204E−01 | −6.20022995E−01 |
| A12= | −5.59390856E−05 | −7.82510644E−01 | 1.76856055E−01 | 6.58092437E−01 |
| A14= | 7.13315623E−06 | 4.75147080E−01 | −9.00198857E−02 | −3.94932174E−01 |
| A16= | −5.52817999E−07 | −1.87130007E−01 | 2.25591025E−02 | 1.22961896E−01 |
| A18= | 2.38922827E−08 | 4.60723951E−02 | −2.13961031E−03 | −1.50222258E−02 |
| A20= | −4.41469472E−10 | −6.44702207E−03 | — | — |
| A22= | — | 3.91572286E−04 | — | — |

| Surface # | 7 | 8 | 10 | 11 |
|---|---|---|---|---|
| k= | −1.81343000E+00 | −4.06092000E+00 | −2.82143000E+01 | 3.61394000E+00 |
| A4= | −3.92999387E−02 | −2.69845602E−02 | −3.07141779E−03 | −3.24809880E−02 |
| A6= | 3.19679257E−02 | −8.93117587E−03 | 1.06628179E−02 | −7.10437866E−03 |
| A8= | −9.34853474E−02 | 3.02502483E−02 | −9.21266828E−03 | 2.89452139E−02 |
| A10= | 1.11000000E−01 | −2.75000000E−02 | 5.89000000E−03 | −2.72000000E−02 |
| A12= | −6.80853613E−02 | 1.34707809E−02 | −2.14276795E−03 | 1.42436309E−02 |
| A14= | 1.92084766E−02 | −3.23758994E−03 | 4.43996250E−04 | −4.49681473E−03 |
| A16= | −1.65692713E−03 | 3.06186338E−04 | −4.89670037E−05 | 8.45986568E−04 |
| A18= | — | — | 2.20749328E−06 | −8.70548238E−05 |
| A20= | — | — | — | 3.75517386E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.28 | f/(T12 + T23) | 0.88 |
| Fno | 1.90 | f/(T23 + T34) | 2.82 |
| HFOV [deg.] | 70.5 | f/f2 | 0.77 |
| (N1 + N2)/2 | 1.66 | f/f23 | 0.82 |
| (R3 + R4)/(R3 − R4) | −0.31 | f/R1 | −0.12 |
| (R3 + R5)/(R3 − R5) | −0.05 | f/R3 | 0.82 |
| (R3 + R6)/(R3 − R6) | 0.18 | f/T23 | 3.00 |
| (R7 + R8)/(R7 − R8) | 5.41 | T23/T34 | 15.16 |
| Dr4s/Dr3s | −0.13 | T34/ΣAT | 0.02 |

-continued

| 2nd Embodiment | | | |
|---|---|---|---|
| Dr5s/Dr6s | 0.43 | TD/CT4 | 7.43 |
| f/(CT2 + CT3) | 0.97 | TD/SL | 1.17 |

3rd Embodiment

Figure 5:
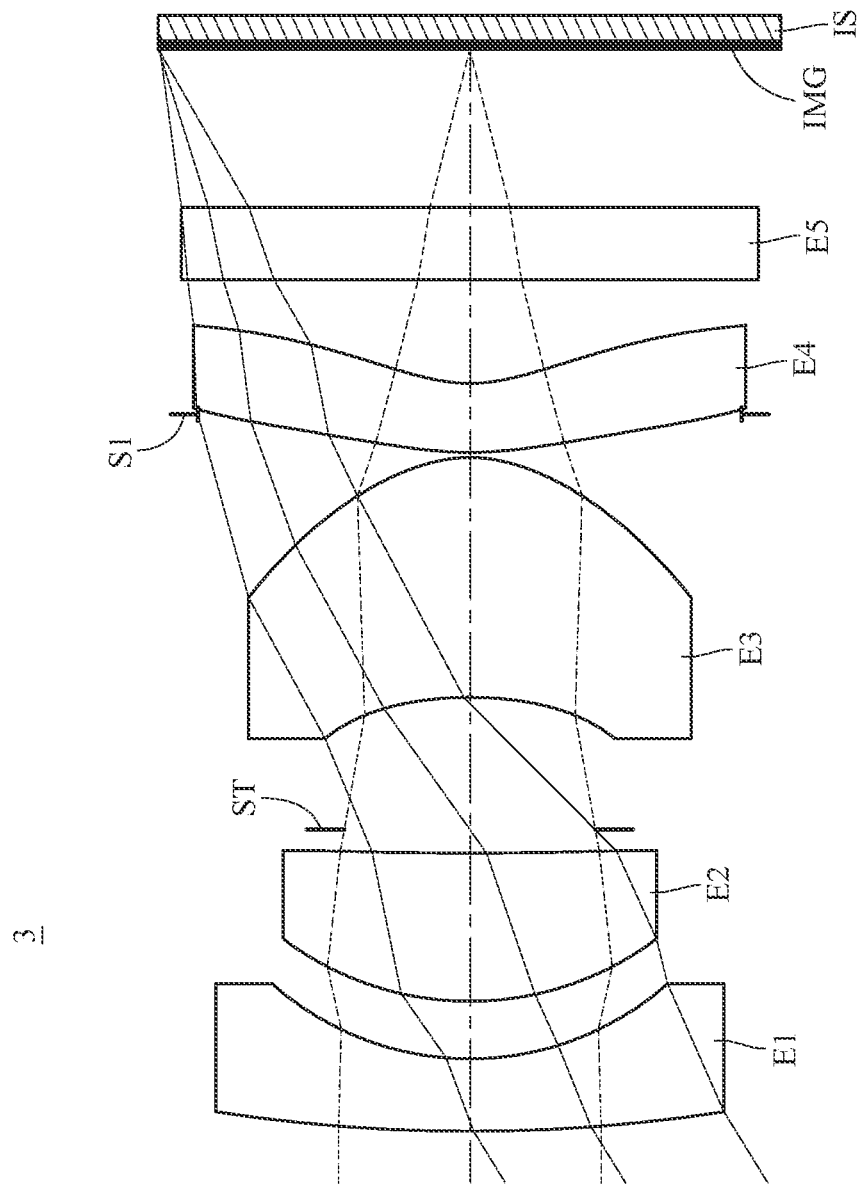
FIG. 5 is a schematic view of an image capturing unit according to the 3rd embodiment of the present disclosure.
Figure 6:
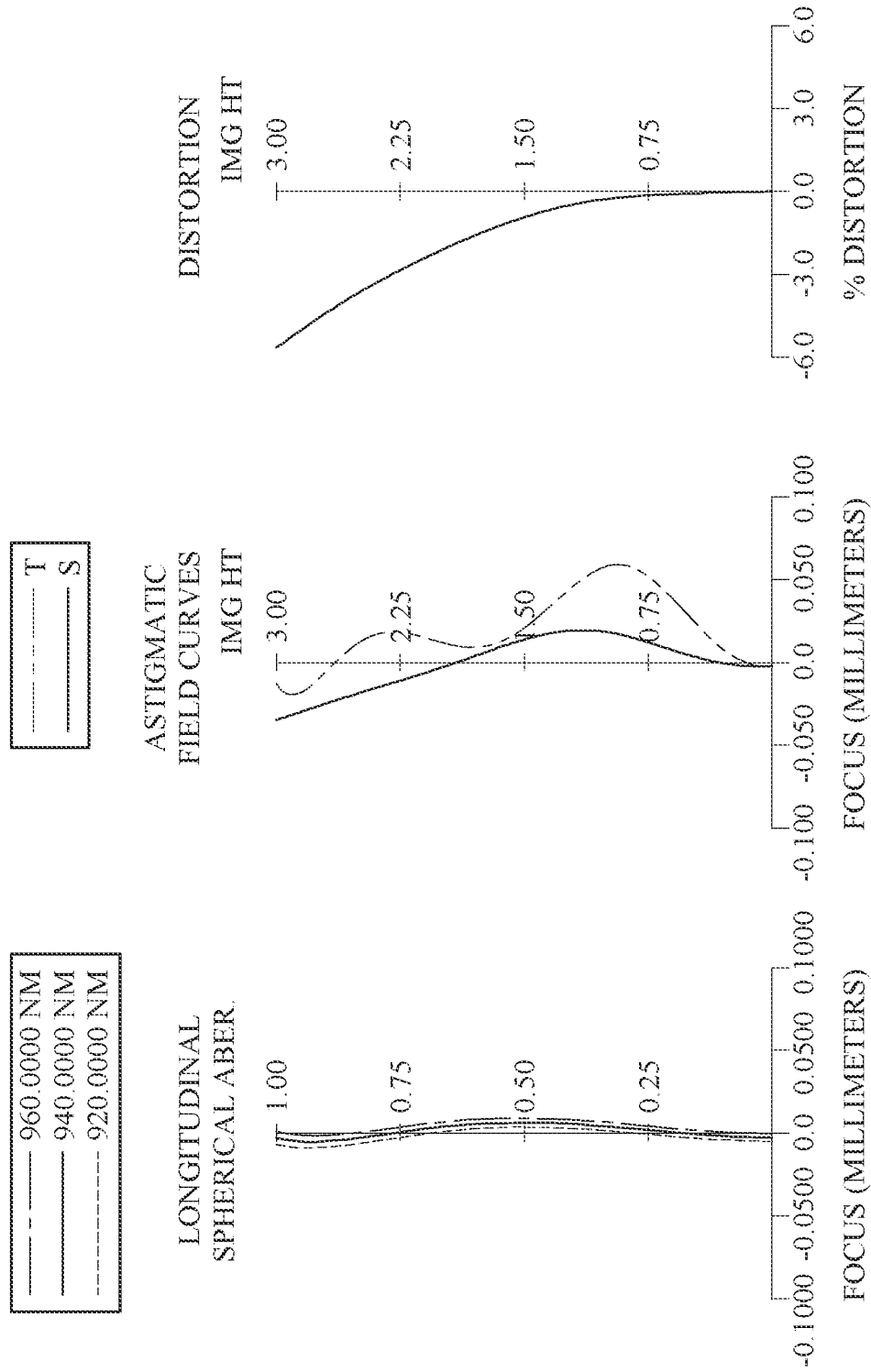
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the image capturing optical system (its reference numeral is omitted) of the present disclosure and an image sensor IS. The image capturing optical system includes, in order from an object side to an image side along an optical axis, a first lens element E1, a second lens element E2, an aperture stop ST, a third lens element E3, a stop S1, a fourth lens element E4, a filter E5 and an image surface IMG. The image capturing optical system includes four lens elements (E1, E2, E3 and E4) with no additional lens element disposed between each of the adjacent four lens elements, wherein there is an air gap in a paraxial region between the second lens element E2 and the third lens element E3.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with positive refractive power has an object-side surface being convex in a paraxial region thereof and an image-side surface being concave in a paraxial region thereof. The second lens element E2 is made of glass material and has the object-side surface and the image-side surface being both spherical.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points.

The filter E5 is made of glass material and located between the fourth lens element E4 and the image surface IMG, and will not affect the focal length of the image capturing optical system. The image sensor IS is disposed on or near the image surface IMG of the image capturing optical system.

The detailed optical data of the 3rd embodiment are shown in Table 5 and the aspheric surface data are shown in Table 6 below.

TABLE 5

3rd Embodiment f = 5.16 mm, Fno = 2.04, HFOV = 31.6 deg.    fd = 5.12 mm

| Surface # | | Curvature Radius | | Thickness | Material | Index | Abbe # | Focal Length | Index | Focal Length |
|---|---|---|---|---|---|---|---|---|---|---|
| 0 | Object | Plano | | Infinity | | | | | | |
| 1 | Lens 1 | 16.0077 | (SPH) | 0.700 | Glass | 1.508 | 64.2 | −7.01 | 1.517 | −6.90 |
| 2 | | 2.8716 | (SPH) | 0.554 | | | | | | |
| 3 | Lens 2 | 2.9868 | (SPH) | 1.429 | Glass | 1.787 | 46.6 | 4.03 | 1.804 | 3.95 |
| 4 | | 39.6058 | (SPH) | 0.228 | | | | | | |
| 5 | Ape. Stop | Plano | | 1.276 | | | | | | |
| 6 | Lens 3 | −3.4917 | (ASP) | 2.314 | Plastic | 1.535 | 56.0 | 3.03 | 1.544 | 2.97 |
| 7 | | −1.3621 | (ASP) | 0.418 | | | | | | |
| 8 | Stop | Plano | | −0.368 | | | | | | |
| 9 | Lens 4 | 3.4051 | (ASP) | 0.666 | Plastic | 1.634 | 20.4 | −4.60 | 1.660 | −4.44 |
| 10 | | 1.4518 | (ASP) | 1.000 | | | | | | |
| 11 | Filter | Plano | | 0.700 | Glass | 1.508 | 64.2 | — | 1.517 | — |
| 12 | | Plano | | 1.523 | | | | | | |
| 13 | Image | Plano | | — | | | | | | |

Note:
Reference wavelength to refractive index and focal length is 940.0 nm.
An effective radius of the stop S1 (Surface 8) is 2.620 mm.
Note:
Reference wavelength is 587.6 nm (d-line).

TABLE 6

Aspheric Coefficients

| Surface # | 6 | 7 | 9 | 10 |
|---|---|---|---|---|
| k= | 2.68620000E+00 | −3.79178000E+00 | −1.68719000E+01 | −6.60047000E+00 |
| A4= | −6.01982342E−03 | −4.39902314E−02 | −9.07710034E−03 | −1.71422336E−02 |
| A6= | −7.76549868E−03 | 1.03397543E−02 | 2.23083866E−03 | 3.02282724E−03 |
| A8= | 2.59792479E−03 | −2.03696189E−03 | −2.51740740E−04 | −3.41524099E−04 |
| A10= | −4.96877501E−04 | 1.74659109E−04 | 1.34331896E−05 | 1.74883312E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 5.16 | f/(T12 + T23) | 2.51 |
| Fno | 2.04 | f/(T23 + T34) | 3.32 |
| HFOV [deg.] | 31.6 | f/f2 | 1.28 |
| (N1 + N2)/2 | 1.65 | f/f23 | 1.23 |

-continued

| 3rd Embodiment | | | |
|---|---|---|---|
| (R3 + R4)/(R3 − R4) | −1.16 | f/R1 | 0.32 |
| (R3 + R5)/(R3 − R5) | −0.08 | f/R3 | 1.73 |
| (R3 + R6)/(R3 − R6) | 0.37 | f/T23 | 3.43 |
| (R7 + R8)/(R7 − R8) | 2.49 | T23/T34 | 30.08 |
| Dr4s/Dr3s | 0.14 | T34/ΣAT | 0.02 |
| Dr5s/Dr6s | 0.36 | TD/CT4 | 10.84 |
| f/(CT2 + CT3) | 1.38 | TD/SL | 0.96 |

4th Embodiment

Figure 7:
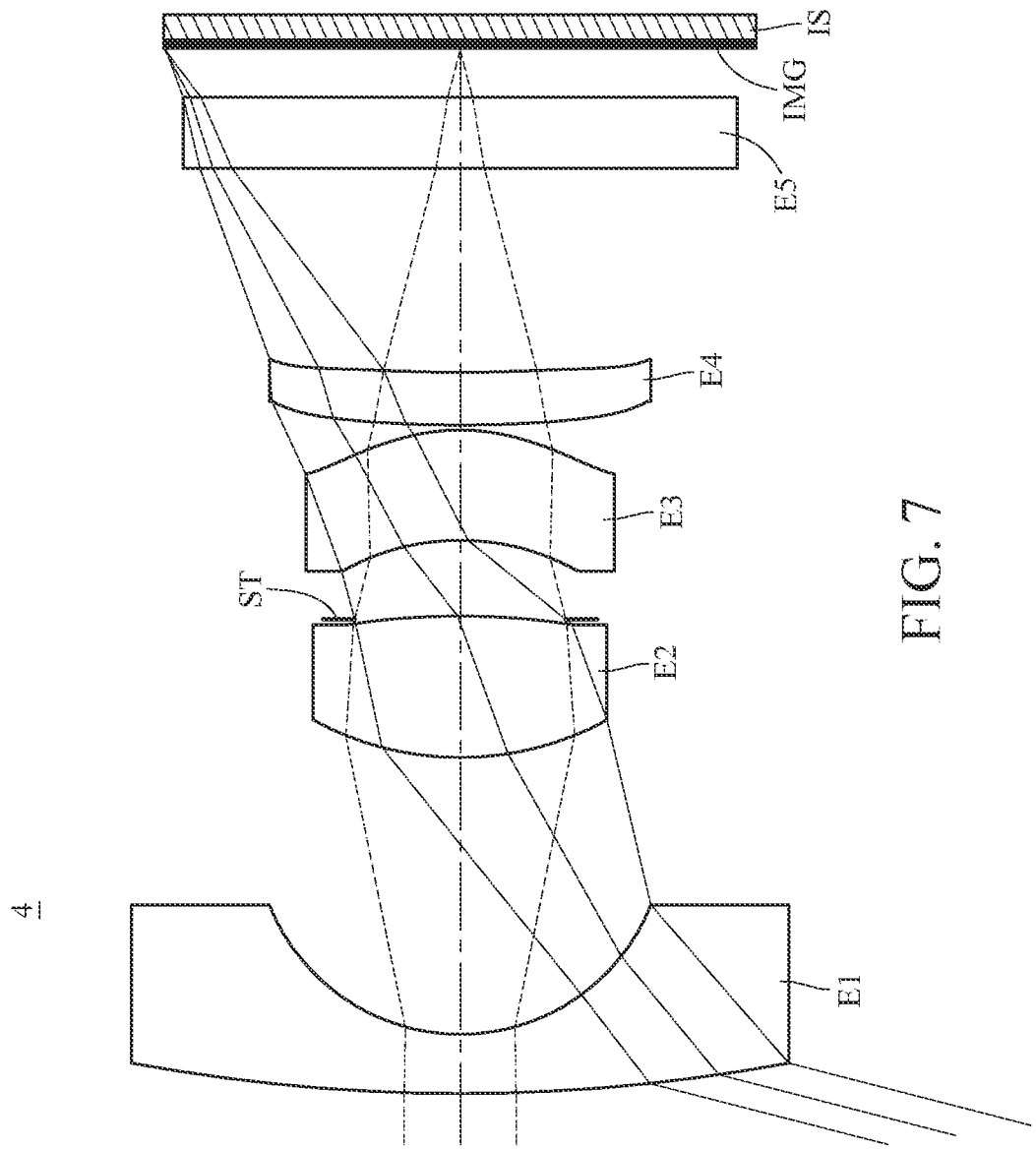
FIG. 7 is a schematic view of an image capturing unit according to the 4th embodiment of the present disclosure.
Figure 8:
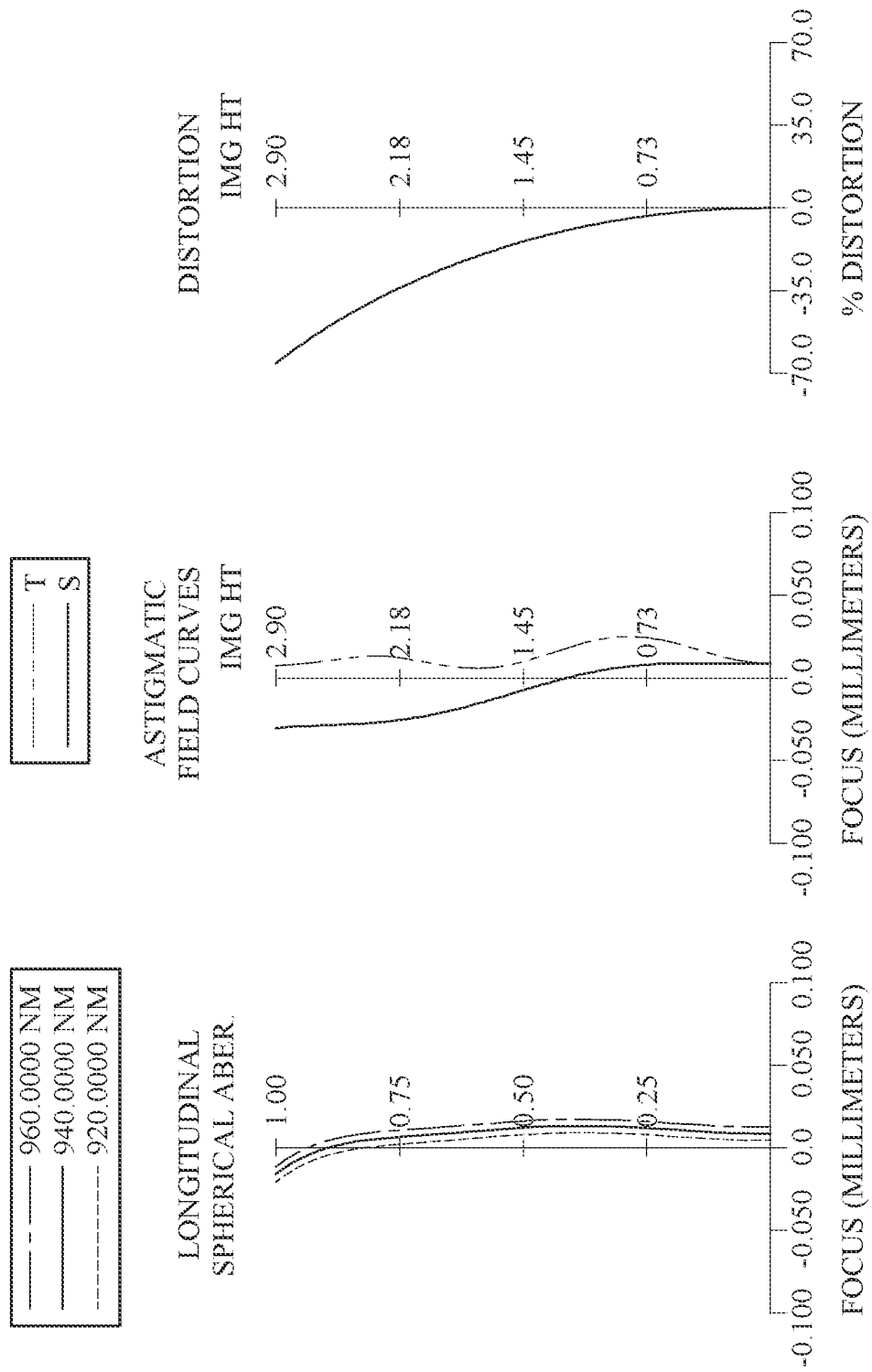
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the image capturing optical system (its reference numeral is omitted) of the present disclosure and an image sensor IS. The image capturing optical system includes, in order from an object side to an image side along an optical axis, a first lens element E1, a second lens element E2, an aperture stop ST, a third lens element E3, a fourth lens element E4, a filter E5 and an image surface IMG. The image capturing optical system includes four lens elements (E1, E2, E3 and E4) with no additional lens element disposed between each of the adjacent four lens elements, wherein there is an air gap in a paraxial region between the second lens element E2 and the third lens element E3.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with positive refractive power has an object-side surface being convex in a paraxial region thereof and an image-side surface being convex in a paraxial region thereof. The second lens element E2 is made of glass material and has the object-side surface and the image-side surface being both spherical.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric. The image-side surface of the third lens element E3 has one inflection point.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The image-side surface of the fourth lens element E4 has two inflection points.

The filter E5 is made of glass material and located between the fourth lens element E4 and the image surface IMG, and will not affect the focal length of the image capturing optical system. The image sensor IS is disposed on or near the image surface IMG of the image capturing optical system.

The detailed optical data of the 4th embodiment are shown in Table 7 and the aspheric surface data are shown in Table 8 below.

TABLE 7

4th Embodiment f = 2.19 mm, Fno = 2.00, HFOV = 75.6 deg.   fd = 2.09 mm

| Surface # | | Curvature Radius | | Thickness | Material | Index | Abbe # | Focal Length | Index | Focal Length |
|---|---|---|---|---|---|---|---|---|---|---|
| 0 | Object | Plano | | Infinity | | | | | | |
| 1 | Lens 1 | 17.5480 | (SPH) | 0.580 | Glass | 1.787 | 46.6 | −2.93 | 1.804 | −2.87 |
| 2 | | 2.0095 | (SPH) | 2.715 | | | | | | |
| 3 | Lens 2 | 2.9988 | (SPH) | 1.389 | Glass | 1.787 | 46.6 | 2.86 | 1.804 | 2.80 |
| 4 | | −7.1750 | (SPH) | −0.034 | | | | | | |
| 5 | Ape. Stop | Plano | | 0.774 | | | | | | |
| 6 | Lens 3 | −2.4986 | (ASP) | 1.083 | Plastic | 1.656 | 18.4 | 7.77 | 1.686 | 7.34 |
| 7 | | −1.9647 | (ASP) | 0.050 | | | | | | |
| 8 | Lens 4 | 15.5140 | (ASP) | 0.514 | Plastic | 1.535 | 56.0 | −59.55 | 1.544 | −58.61 |
| 9 | | 10.3144 | (ASP) | 2.000 | | | | | | |
| 10 | Filter | Plano | | 0.700 | Glass | 1.508 | 64.2 | — | 1.517 | — |
| 11 | | Plano | | 0.480 | | | | | | |
| 12 | Image | Plano | | — | | | | | | |

Note:
Reference wavelength to refractive index and focal length is 940.0 nm.
Note:
Reference wavelength is 587.6 nm (d-line).

TABLE 8

Aspheric Coefficients

| Surface # | 6 | 7 | 8 | 9 |
|---|---|---|---|---|
| k= | −2.82650000E+00 | −4.81173000E+00 | 2.26876000E+01 | 1.03939000E+01 |
| A4= | −4.76500775E−02 | −2.85903658E−02 | 1.55189214E−02 | −3.10408895E−02 |
| A6= | 2.89228485E−02 | 1.11722607E−02 | −9.51119064E−03 | 1.60635285E−02 |
| A8= | −4.74914944E−02 | −4.37850263E−03 | 1.37974880E−03 | −6.65267645E−03 |

TABLE 8-continued

| Aspheric Coefficients | | | | |
|---|---|---|---|---|
| Surface # | 6 | 7 | 8 | 9 |
| A10= | 5.41878080E−02 | 2.37862885E−03 | 1.02257057E−03 | 1.72322067E−03 |
| A12= | −2.85891566E−02 | 2.29063333E−05 | −2.97627636E−04 | −1.46855161E−04 |
| A14= | 5.84091909E−03 | −1.03536113E−04 | 2.26626673E−05 | −7.22369360E−08 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.19 | f/(T12 + T23) | 0.63 |
| Fno | 2.00 | f/(T23 + T34) | 2.77 |
| HFOV [deg.] | 75.6 | f/f2 | 0.76 |
| (N1 + N2)/2 | 1.79 | f/f23 | 0.75 |
| (R3 + R4)/(R3 − R4) | −0.41 | f/R1 | 0.12 |
| (R3 + R5)/(R3 − R5) | 0.09 | f/R3 | 0.73 |
| (R3 + R6)/(R3 − R6) | 0.21 | f/T23 | 2.95 |
| (R7 + R8)/(R7 − R8) | 4.97 | T23/T34 | 14.80 |
| Dr4s/Dr3s | −0.03 | T34/ΣAT | 0.01 |
| Dr5s/Dr6s | 0.42 | TD/CT4 | 13.76 |
| f/(CT2 + CT3) | 0.88 | TD/SL | 1.26 |

5th Embodiment

Figure 9:
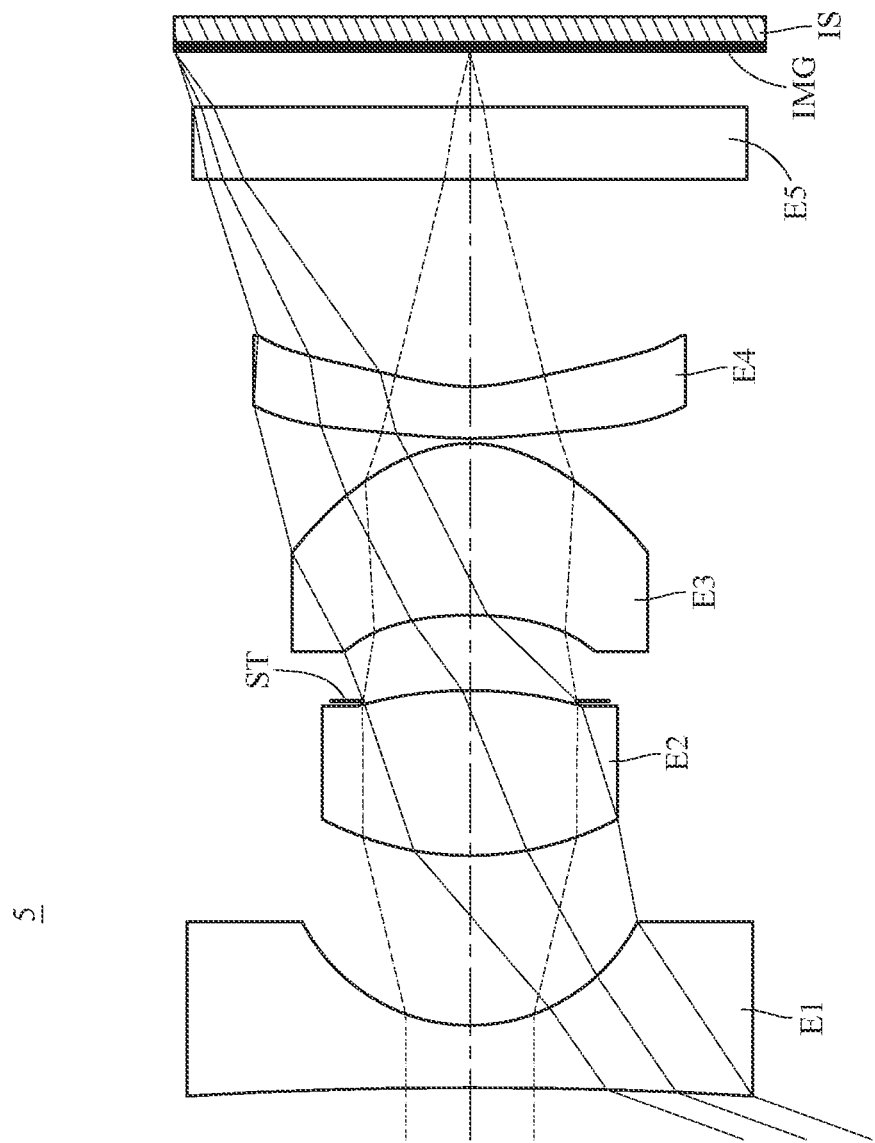
FIG. 9 is a schematic view of an image capturing unit according to the 5th embodiment of the present disclosure.
Figure 10:
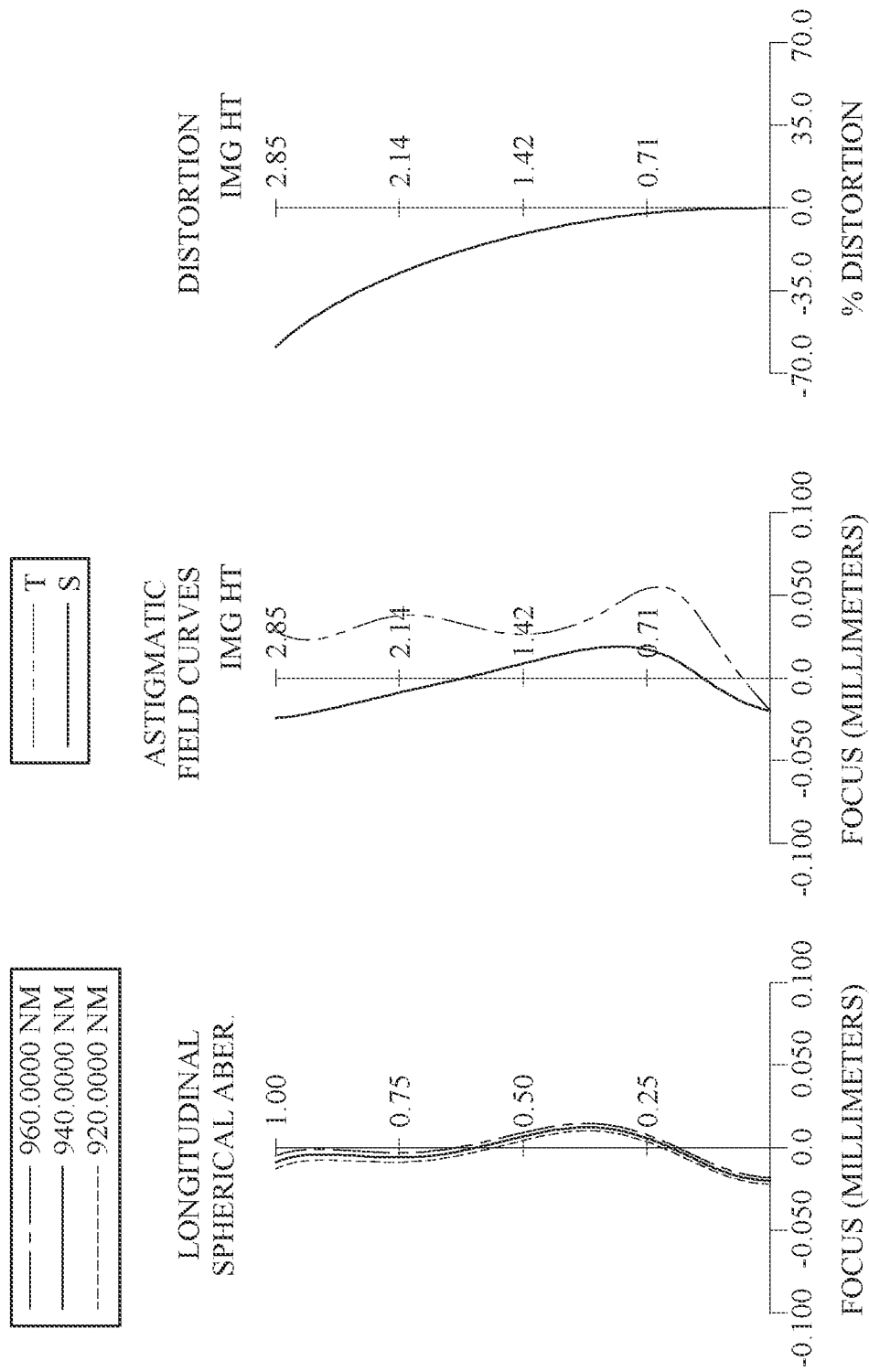
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the image capturing optical system (its reference numeral is omitted) of the present disclosure and an image sensor IS. The image capturing optical system includes, in order from an object side to an image side along an optical axis, a first lens element E1, a second lens element E2, an aperture stop ST, a third lens element E3, a fourth lens element E4, a filter E5 and an image surface IMG. The image capturing optical system includes four lens elements (E1, E2, E3 and E4) with no additional lens element disposed between each of the adjacent four lens elements, wherein there is an air gap in a paraxial region between the second lens element E2 and the third lens element E3.

The first lens element E1 with negative refractive power has an object-side surface being concave in a paraxial region thereof and an image-side surface being concave in a paraxial region thereof. The first lens element E1 is made of glass material and has the object-side surface and the image-side surface being both spherical.

The second lens element E2 with positive refractive power has an object-side surface being convex in a paraxial region thereof and an image-side surface being convex in a paraxial region thereof. The second lens element E2 is made of glass material and has the object-side surface and the image-side surface being both spherical.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric. The image-side surface of the third lens element E3 has one inflection point.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The image-side surface of the fourth lens element E4 has two inflection points.

The filter E5 is made of glass material and located between the fourth lens element E4 and the image surface IMG, and will not affect the focal length of the image capturing optical system. The image sensor IS is disposed on or near the image surface IMG of the image capturing optical system.

The detailed optical data of the 5th embodiment are shown in Table 9 and the aspheric surface data are shown in Table 10 below.

TABLE 9

| 5th Embodiment | | | | | | | | | |
|---|---|---|---|---|---|---|---|---|---|
| f = 2.52 mm, Fno = 2.05, HFOV = 70.0 deg. | | | | | | | | fd = 2.48 mm | |
| Surface # | | Curvature Radius | | Thickness | Material | Index | Abbe # | Focal Length | Index | Focal Length |
| 0 | Object | Plano | | Infinity | | | | | | |
| 1 | Lens 1 | −45.5200 | (SPH) | 0.600 | Glass | 1.593 | 60.6 | −2.92 | 1.603 | −2.87 |
| 2 | | 1.8059 | (SPH) | 1.638 | | | | | | |
| 3 | Lens 2 | 3.0490 | (SPH) | 1.595 | Glass | 1.612 | 58.2 | 3.09 | 1.623 | 3.04 |
| 4 | | −3.9845 | (SPH) | −0.100 | | | | | | |
| 5 | Ape. Stop | Plano | | 0.825 | | | | | | |
| 6 | Lens 3 | −3.2105 | (ASP) | 1.656 | Plastic | 1.535 | 56.0 | 3.08 | 1.544 | 3.02 |
| 7 | | −1.2844 | (ASP) | 0.050 | | | | | | |

TABLE 9-continued

5th Embodiment f = 2.52 mm, Fno = 2.05, HFOV = 70.0 deg.  fd = 2.48 mm

| Surface # | | Curvature Radius | | Thickness | Material | Index | Abbe # | Focal Length | Index | Focal Length |
|---|---|---|---|---|---|---|---|---|---|---|
| 8 | Lens 4 | 3.8784 | (ASP) | 0.500 | Plastic | 1.616 | 23.5 | −5.64 | 1.639 | −5.45 |
| 9 | | 1.7422 | (ASP) | 2.000 | | | | | | |
| 10 | Filter | Plano | | 0.700 | Glass | 1.508 | 64.2 | — | 1.517 | — |
| 11 | | Plano | | 0.537 | | | | | | |
| 12 | Image | Plano | | — | | | | | | |

Note:
Reference wavelength to refractive index and focal length is 940.0 nm.
Note:
Reference wavelength is 587.6 nm (d-line).

TABLE 10

Aspheric Coefficients

| Surface # | 6 | 7 | 8 | 9 |
|---|---|---|---|---|
| k= | 1.35474000E+00 | −2.06043000E+00 | −6.75013000E+01 | −1.09837000E+01 |
| A4= | −2.52290192E−02 | −3.63384084E−03 | −6.24629234E−03 | −2.79000409E−02 |
| A6= | −2.39134656E−02 | −1.83922513E−02 | 1.83490633E−04 | 1.28683960E−02 |
| A8= | 1.14670128E−02 | 6.52269308E−03 | 1.54746317E−03 | −3.26165268E−03 |
| A10= | −8.04972352E−03 | −1.42004621E−03 | −2.65114771E−04 | 6.37467961E−04 |
| A12= | 2.81455615E−03 | 1.88847181E−04 | 1.14949930E−05 | −5.09756469E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.52 | f/(T12 + T23) | 1.07 |
| Fno | 2.05 | f/(T23 + T34) | 3.26 |
| HFOV [deg.] | 70.0 | f/f2 | 0.82 |
| (N1 + N2)/2 | 1.60 | f/f23 | 0.91 |
| (R3 + R4)/(R3 − R4) | −0.13 | f/R1 | −0.06 |
| (R3 + R5)/(R3 − R5) | −0.03 | f/R3 | 0.83 |
| (R3 + R6)/(R3 − R6) | 0.41 | f/T23 | 3.48 |
| (R7 + R8)/(R7 − R8) | 2.63 | T23/T34 | 14.50 |
| Dr4s/Dr3s | −0.07 | T34/ΣAT | 0.02 |
| Dr5s/Dr6s | 0.33 | TD/CT4 | 13.53 |
| f/(CT2 + CT3) | 0.78 | TD/SL | 1.08 |

6th Embodiment

Figure 11:
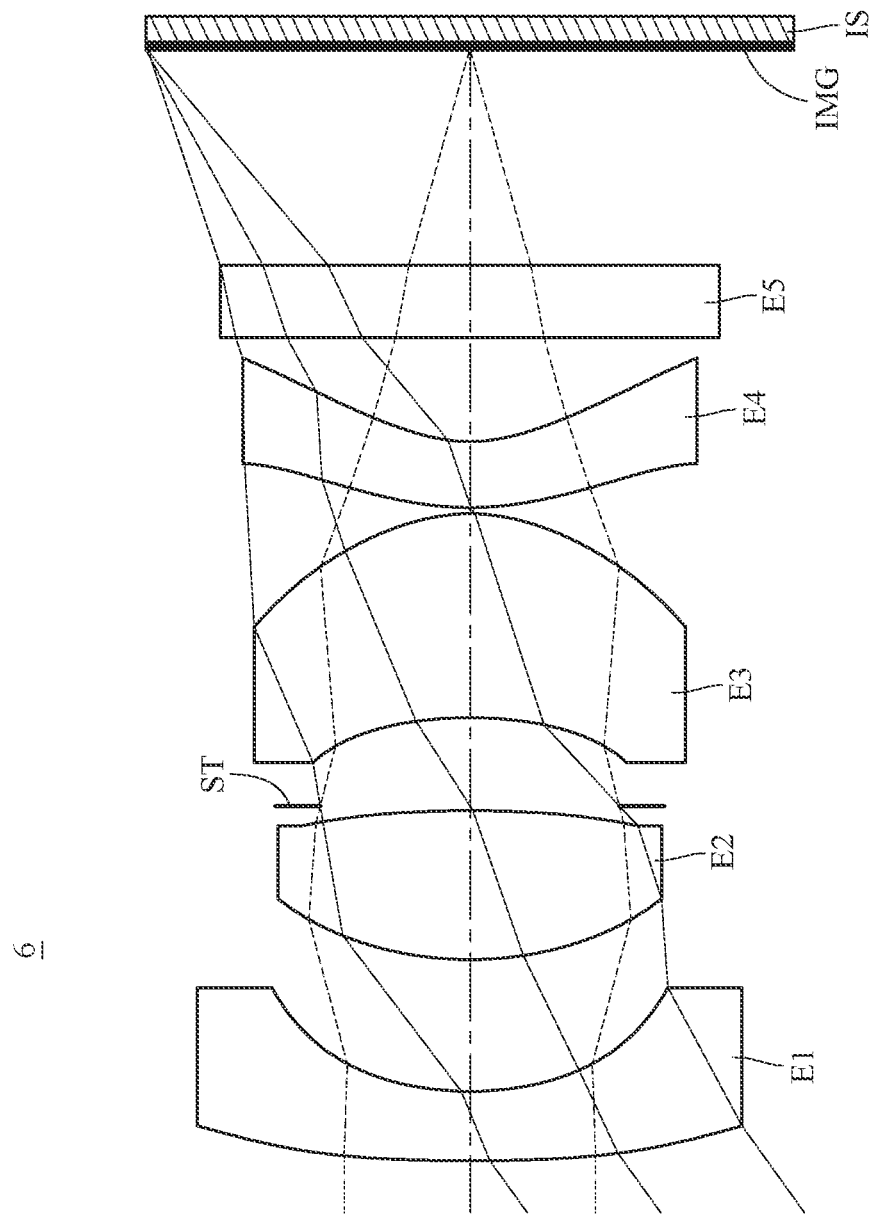
FIG. 11 is a schematic view of an image capturing unit according to the 6th embodiment of the present disclosure.
Figure 12:
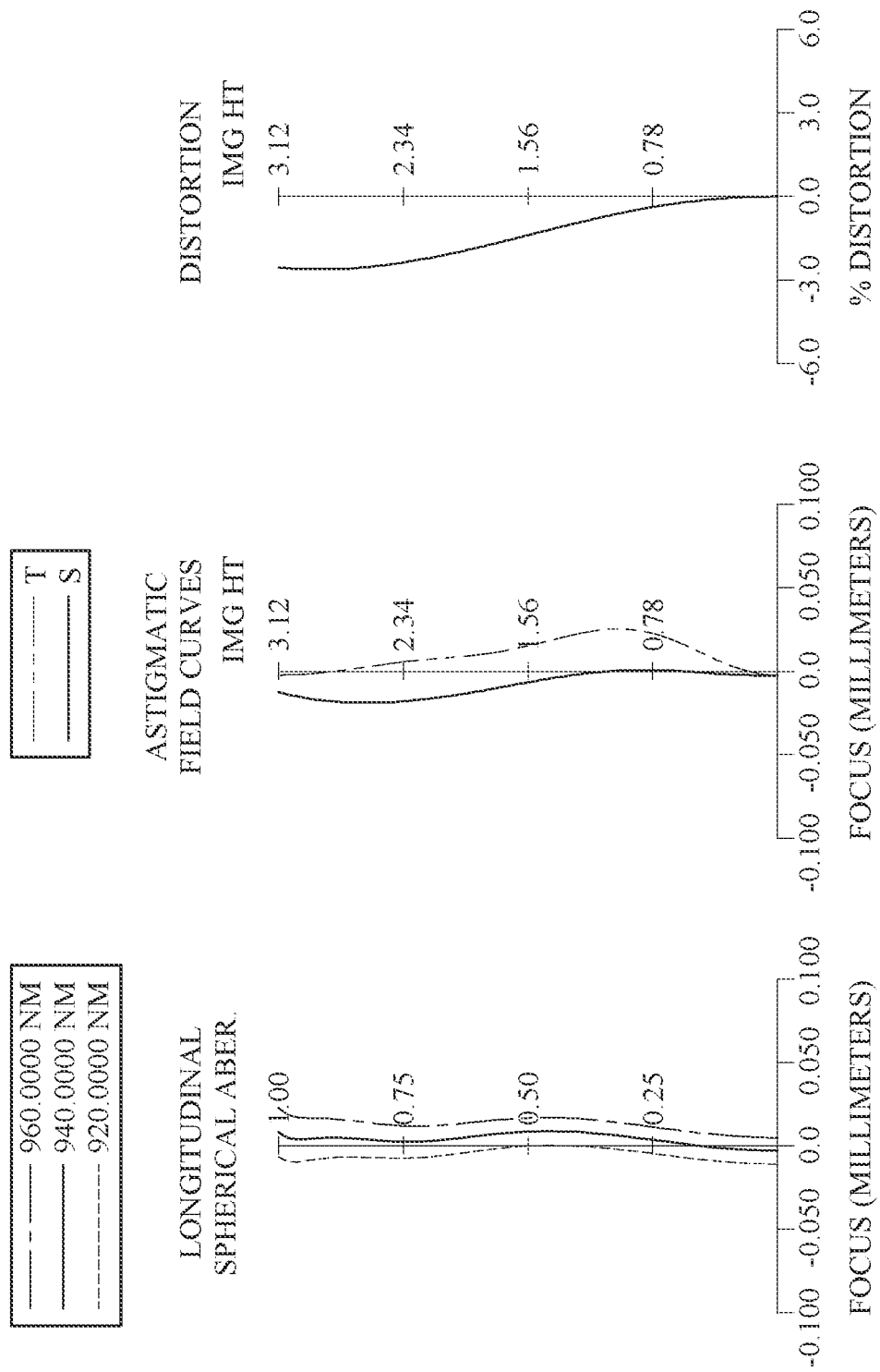
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes the image capturing optical system (its reference numeral is omitted) of the present disclosure and an image sensor IS. The image capturing optical system includes, in order from an object side to an image side along an optical axis, a first lens element E1, a second lens element E2, an aperture stop ST, a third lens element E3, a fourth lens element E4, a filter E5 and an image surface IMG. The image capturing optical system includes four lens elements (E1, E2, E3 and E4) with no additional lens element disposed between each of the adjacent four lens elements, wherein there is an air gap in a paraxial region between the second lens element E2 and the third lens element E3.

The first lens element E1 with negative refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has two inflection points.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one inflection point. The image-side surface of the fourth lens element E4 has one inflection point.

The filter E5 is made of glass material and located between the fourth lens element E4 and the image surface IMG, and will not affect the focal length of the image capturing optical system. The image sensor IS is disposed on or near the image surface IMG of the image capturing optical system.

The detailed optical data of the 6th embodiment are shown in Table 11 and the aspheric surface data are shown in Table 12 below.

TABLE 11

6th Embodiment f = 4.46 mm, Fno = 1.84, HFOV = 35.7 deg.　　　　fd = 4.20 mm

| Surface # | | Curvature Radius | | Thickness | Material | Index | Abbe # | Focal Length | Index | Focal Length |
|---|---|---|---|---|---|---|---|---|---|---|
| 0 | Object | Plano | | Infinity | | | | | | |
| 1 | Lens 1 | 20.8605 | (ASP) | 0.670 | Plastic | 1.553 | 37.4 | −6.68 | 1.566 | −6.52 |
| 2 | | 3.0999 | (ASP) | 1.271 | | | | | | |
| 3 | Lens 2 | 3.4266 | (ASP) | 1.437 | Plastic | 1.634 | 20.4 | 4.30 | 1.660 | 4.14 |
| 4 | | −11.2065 | (ASP) | 0.046 | | | | | | |
| 5 | Ape. Stop | Plano | | 0.850 | | | | | | |
| 6 | Lens 3 | −4.0061 | (ASP) | 1.968 | Plastic | 1.641 | 19.5 | 3.70 | 1.669 | 3.52 |
| 7 | | −1.7760 | (ASP) | 0.060 | | | | | | |
| 8 | Lens 4 | 2.9071 | (ASP) | 0.637 | Plastic | 1.656 | 18.4 | −5.65 | 1.686 | −5.43 |
| 9 | | 1.4876 | (ASP) | 1.000 | | | | | | |
| 10 | Filter | Plano | | 0.700 | Glass | 1.508 | 64.2 | — | 1.517 | — |
| 11 | | Plano | | 2.078 | | | | | | |
| 12 | Image | Plano | | — | | | | | | |

Note:
Reference wavelength to refractive index and focal length is 940.0 nm.

Note:
Reference wavelength is 587.6 nm (d-line).

TABLE 12

Aspheric Coefficients

| Surface # | 1 | 2 | 3 | 4 |
|---|---|---|---|---|
| k= | 5.36132000E+01 | 1.05607000E+00 | 2.41408000E−01 | −2.24555000E+01 |
| A4= | 5.83240030E−03 | 1.04926591E−02 | −1.47086307E−04 | −6.47836951E−03 |
| A6= | −4.79327741E−04 | −1.17675202E−03 | 6.02074738E−04 | 2.87793186E−04 |
| A8= | −1.39029317E−05 | 2.17397320E−03 | 1.93423681E−04 | −4.76984897E−04 |
| A10= | 5.77677176E−06 | −1.18636774E−03 | −1.17576558E−04 | 4.55754608E−04 |
| A12= | −7.73456090E−07 | 3.60777631E−04 | 5.16964788E−05 | −1.63820290E−04 |
| A14= | 0.00000000E+00 | −4.08161888E−05 | −7.99483506E−06 | 2.04565955E−05 |

| Surface # | 6 | 7 | 8 | 9 |
|---|---|---|---|---|
| k= | −1.05030000E+00 | −4.59648000E+00 | −1.01364000E+01 | −4.87032000E+00 |
| A4= | −1.33178208E−02 | −3.12549389E−02 | 1.08784158E−02 | 7.70761554E−03 |
| A6= | −9.06275389E−03 | 7.16172098E−03 | −3.89743938E−03 | −3.72253437E−04 |
| A8= | 8.19287709E−03 | −2.41573072E−03 | −9.00799811E−06 | −1.59527993E−03 |
| A10= | −8.36384902E−03 | 5.73397548E−04 | 2.12311178E−04 | 7.34796695E−04 |
| A12= | 4.59032387E−03 | −8.70843899E−05 | −5.50349562E−05 | −1.63339998E−04 |
| A14= | −1.36966850E−03 | 6.24838000E−06 | 5.31770621E−06 | 1.84240884E−05 |
| A16= | 1.61075183E−04 | −5.98828650E−08 | −1.50514209E−07 | −8.30137788E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.46 | f/(T12 + T23) | 2.06 |
| Fno | 1.84 | f/(T23 + T34) | 4.67 |
| HFOV [deg.] | 35.7 | f/f2 | 1.04 |
| (N1 + N2)/2 | 1.59 | f/f23 | 1.35 |

-continued

| 6th Embodiment | | | |
|---|---|---|---|
| (R3 + R4)/(R3 − R4) | −0.53 | f/R1 | 0.21 |
| (R3 + R5)/(R3 − R5) | −0.08 | f/R3 | 1.30 |
| (R3 + R6)/(R3 − R6) | 0.32 | f/T23 | 4.98 |
| (R7 + R8)/(R7 − R8) | 3.10 | T23/T34 | 14.93 |
| Dr4s/Dr3s | 0.03 | T34/ΣAT | 0.03 |
| Dr5s/Dr6s | 0.30 | TD/CT4 | 10.89 |
| f/(CT2 + CT3) | 1.31 | TD/SL | 0.95 |

7th Embodiment

Figure 13:
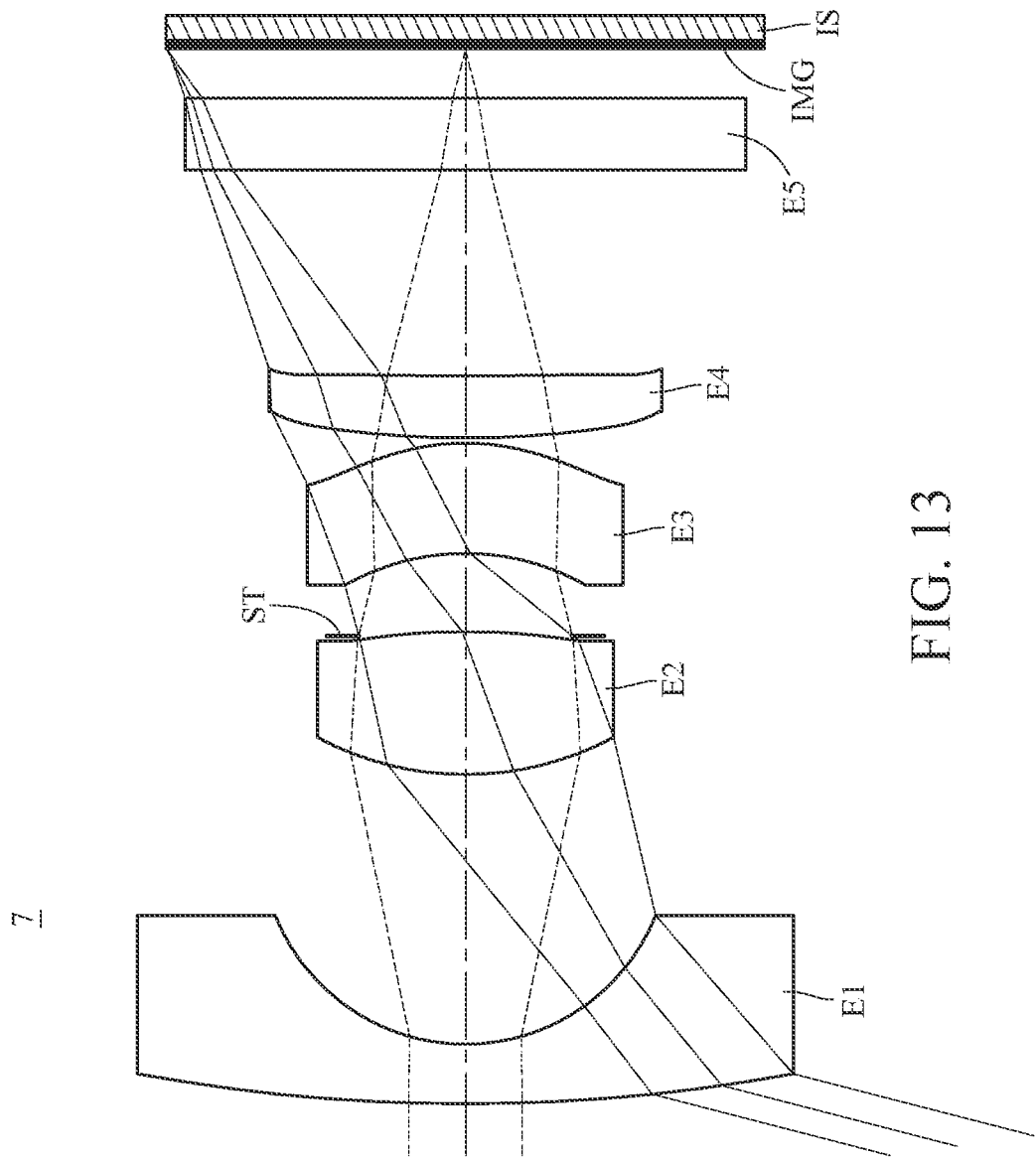
FIG. 13 is a schematic view of an image capturing unit according to the 7th embodiment of the present disclosure.
Figure 14:
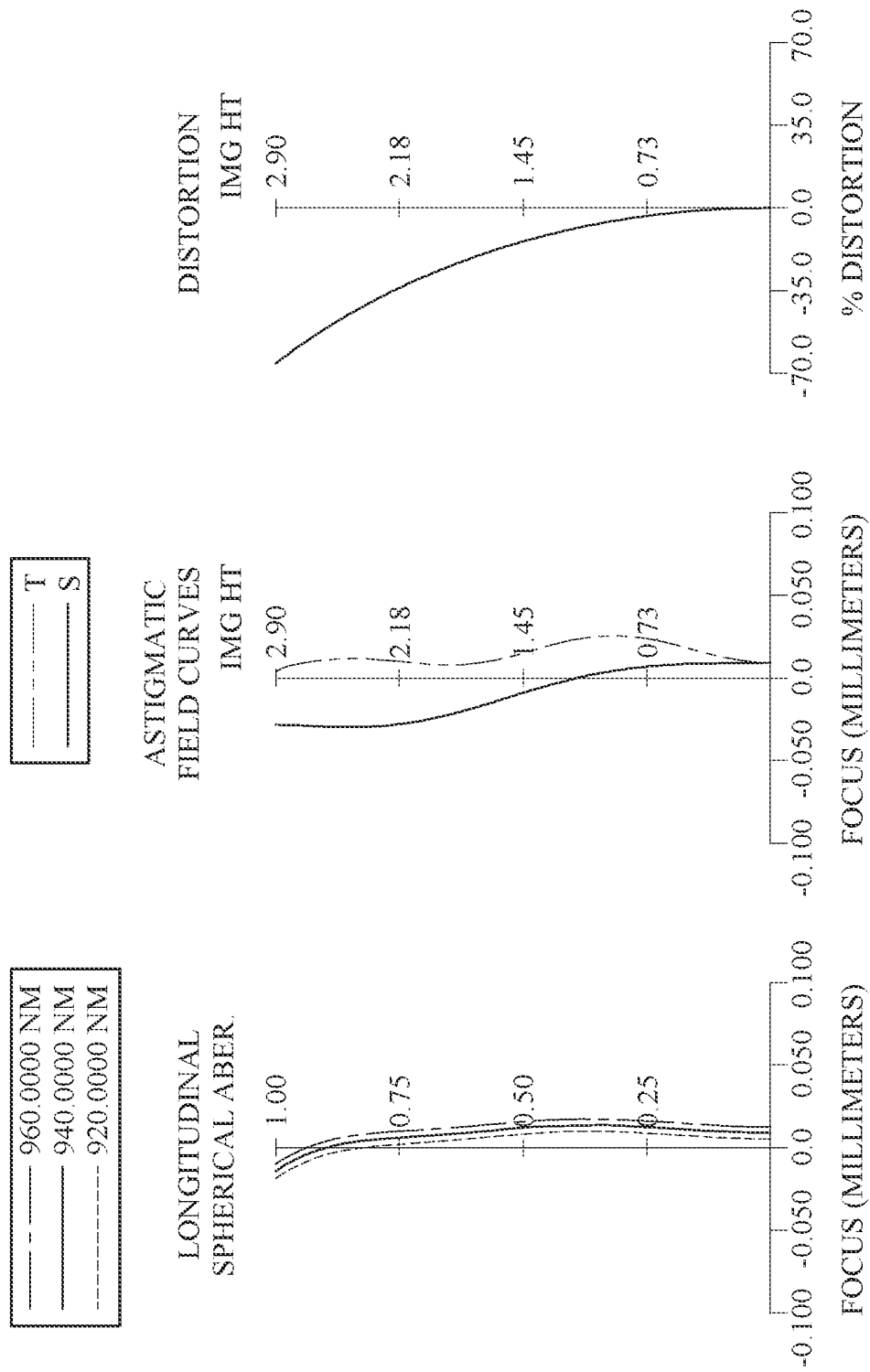
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes the image capturing optical system (its reference numeral is omitted) of the present disclosure and an image sensor IS. The image capturing optical system includes, in order from an object side to an image side along an optical axis, a first lens element E1, a second lens element E2, an aperture stop ST, a third lens element E3, a fourth lens element E4, a filter E5 and an image surface IMG. The image capturing optical system includes four lens elements (E1, E2, E3 and E4) with no additional lens element disposed between each of the adjacent four lens elements, wherein there is an air gap in a paraxial region between the second lens element E2 and the third lens element E3.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with positive refractive power has an object-side surface being convex in a paraxial region thereof and an image-side surface being convex in a paraxial region thereof. The second lens element E2 is made of glass material and has the object-side surface and the image-side surface being both spherical.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric. The image-side surface of the third lens element E3 has one inflection point.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The image-side surface of the fourth lens element E4 has two inflection points. The image-side surface of the fourth lens element E4 has two critical points in an off-axis region thereof.

The filter E5 is made of glass material and located between the fourth lens element E4 and the image surface IMG, and will not affect the focal length of the image capturing optical system. The image sensor IS is disposed on or near the image surface IMG of the image capturing optical system.

The detailed optical data of the 7th embodiment are shown in Table 13 and the aspheric surface data are shown in Table 14 below.

TABLE 13

7th Embodiment f = 2.20 mm, Fno = 2.00, HFOV = 75.5 deg.  fd = 2.11 mm

| Surface # | | Curvature Radius | | Thickness | Material | Index | Abbe # | Focal Length | Index | Focal Length |
|---|---|---|---|---|---|---|---|---|---|---|
| 0 | Object | Plano | | Infinity | | | | | | |
| 1 | Lens 1 | 17.4819 | (SPH) | 0.580 | Glass | 1.787 | 46.6 | −2.89 | 1.804 | −2.84 |
| 2 | | 1.9868 | (SPH) | 2.620 | | | | | | |
| 3 | Lens 2 | 3.0360 | (SPH) | 1.388 | Glass | 1.787 | 46.6 | 2.85 | 1.804 | 2.80 |
| 4 | | −6.9092 | (SPH) | −0.038 | | | | | | |
| 5 | Ape. Stop | Plano | | 0.796 | | | | | | |
| 6 | Lens 3 | −2.4598 | (ASP) | 1.074 | Plastic | 1.656 | 18.4 | 11.80 | 1.686 | 11.10 |
| 7 | | −2.1898 | (ASP) | 0.050 | | | | | | |
| 8 | Lens 4 | 10.8230 | (ASP) | 0.600 | Plastic | 1.535 | 56.0 | 35.95 | 1.544 | 35.36 |
| 9 | | 24.2594 | (ASP) | 2.000 | | | | | | |
| 10 | Filter | Plano | | 0.700 | Glass | 1.508 | 64.2 | — | 1.517 | — |
| 11 | | Plano | | 0.479 | | | | | | |
| 12 | Image | Plano | | — | | | | | | |

Note:
Reference wavelength to refractive index and focal length is 940.0 nm.
Note:
Reference wavelength is 587.6 nm (d-line).

TABLE 14

Aspheric Coefficients

| Surface # | 6 | 7 | 8 | 9 |
|---|---|---|---|---|
| k= | −3.05638000E+00 | −5.04947000E+00 | −1.03016000E+01 | 6.32213000E+01 |
| A4= | −4.56570428E−02 | −2.40658163E−02 | 1.67704309E−02 | −1.46648873E−02 |
| A6= | 3.22066478E−02 | 7.60385784E−03 | −1.28353215E−02 | 6.59262729E−03 |
| A8= | −5.67887654E−02 | −3.40526197E−03 | 3.02871736E−03 | −3.39775642E−03 |
| A10= | 6.43182893E−02 | 2.64156225E−03 | 4.29961528E−04 | 1.00542220E−03 |
| A12= | −3.44120941E−02 | −2.96319648E−04 | −1.80105307E−04 | −8.38712319E−05 |
| A14= | 7.14294012E−03 | −3.99248264E−05 | 1.43363133E−05 | 1.31802517E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.20 | f/(T12 + T23) | 0.65 |
| Fno | 2.00 | f/(T23 + T34) | 2.72 |
| HFOV [deg.] | 75.5 | f/f2 | 0.77 |
| (N1 + N2)/2 | 1.79 | f/f23 | 0.72 |
| (R3 + R4)/(R3 − R4) | −0.39 | f/R1 | 0.13 |
| (R3 + R5)/(R3 − R5) | 0.10 | f/R3 | 0.72 |
| (R3 + R6)/(R3 − R6) | 0.16 | f/T23 | 2.90 |
| (R7 + R8)/(R7 − R8) | −2.61 | T23/T34 | 15.16 |
| Dr4s/Dr3s | −0.03 | T34/ΣAT | 0.01 |
| Dr5s/Dr6s | 0.43 | TD/CT4 | 11.78 |
| f/(CT2 + CT3) | 0.89 | TD/SL | 1.24 |

8th Embodiment

Figure 15:
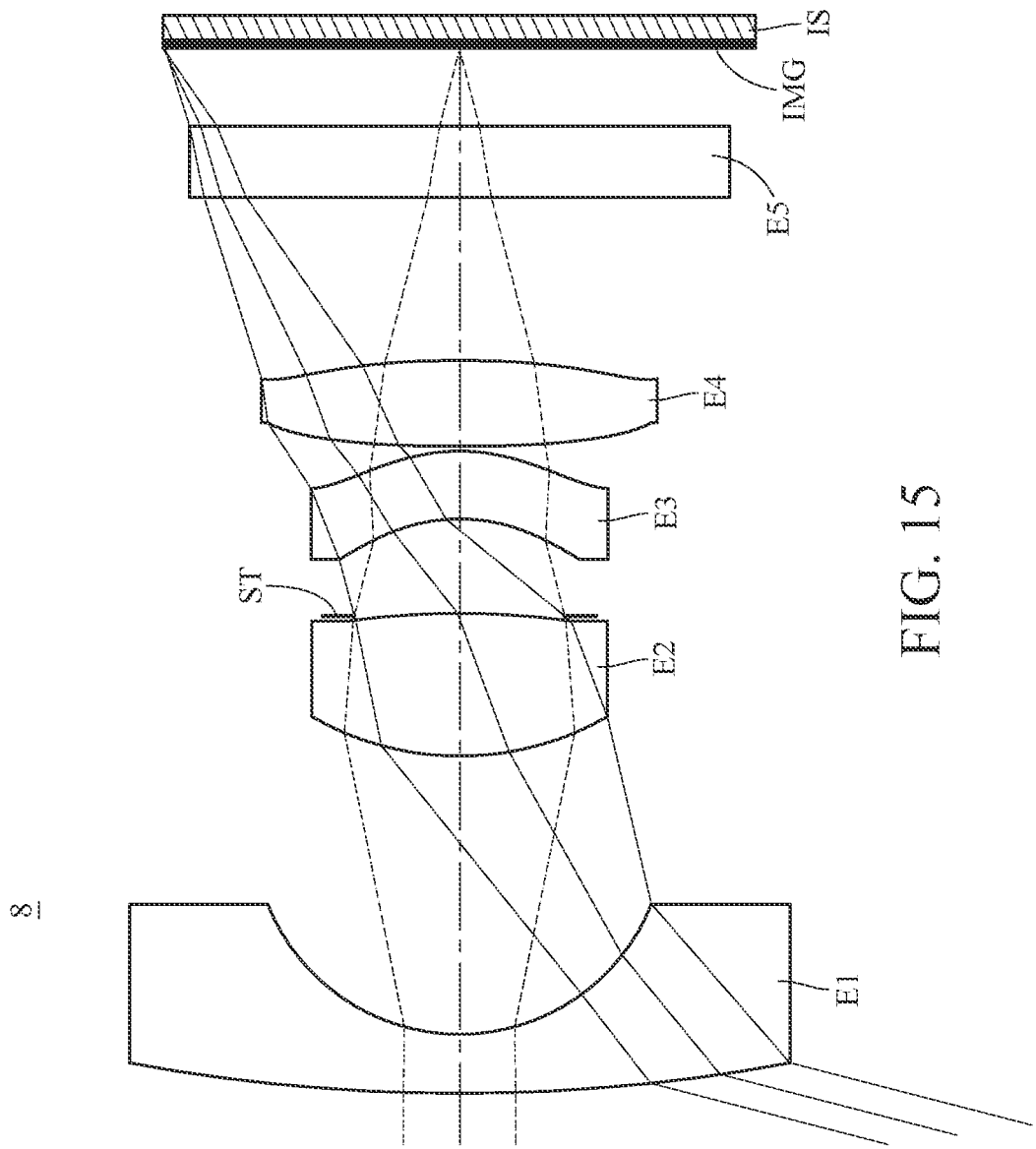
FIG. 15 is a schematic view of an image capturing unit according to the 8th embodiment of the present disclosure.
Figure 16:
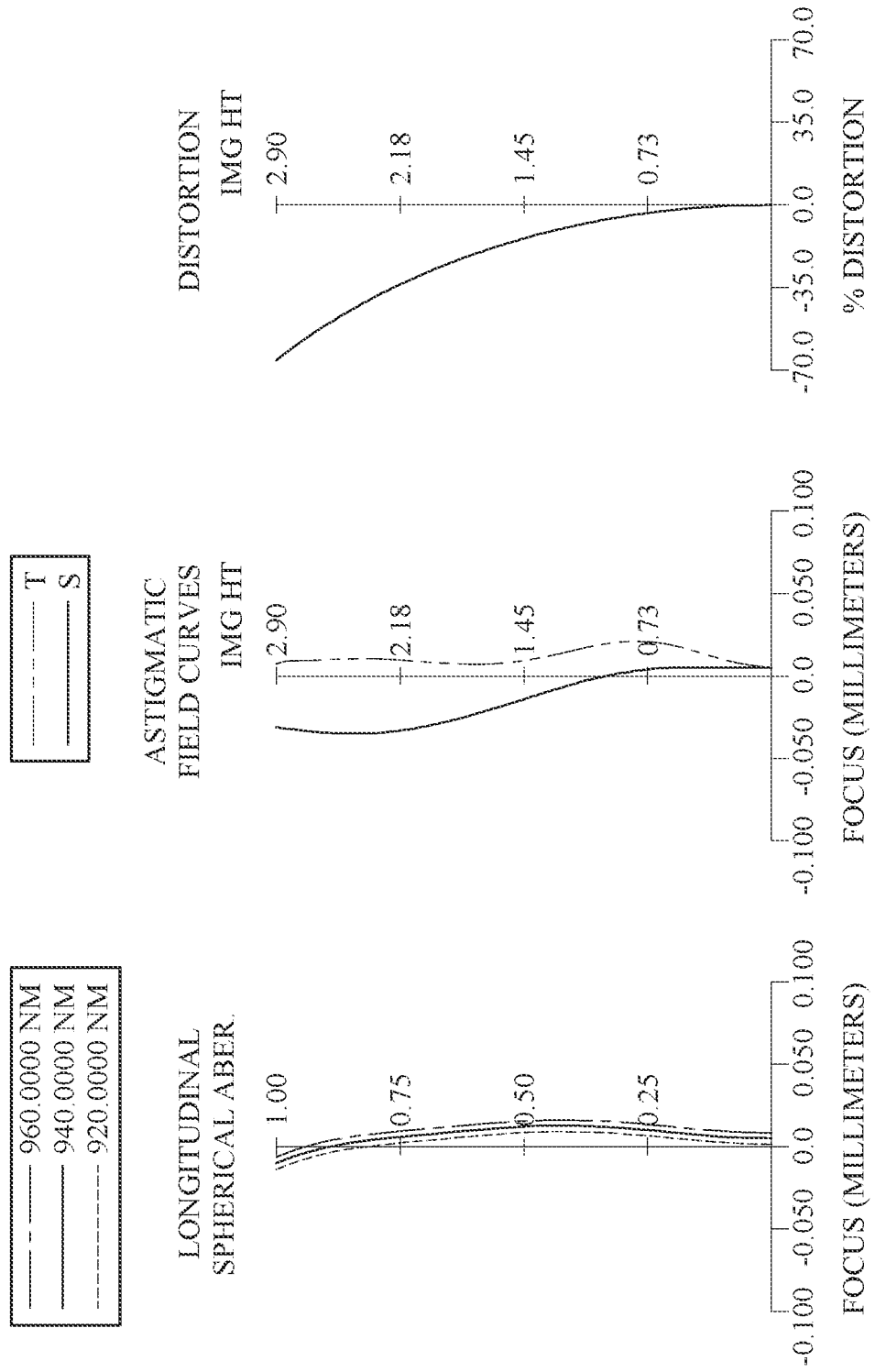
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit 8 includes the image capturing optical system (its reference numeral is omitted) of the present disclosure and an image sensor IS. The image capturing optical system includes, in order from an object side to an image side along an optical axis, a first lens element E1, a second lens element E2, an aperture stop ST, a third lens element E3, a fourth lens element E4, a filter E5 and an image surface IMG. The image capturing optical system includes four lens elements (E1, E2, E3 and E4) with no additional lens element disposed between each of the adjacent four lens elements, wherein there is an air gap in a paraxial region between the second lens element E2 and the third lens element E3.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with positive refractive power has an object-side surface being convex in a paraxial region thereof and an image-side surface being convex in a paraxial region thereof. The second lens element E2 is made of glass material and has the object-side surface and the image-side surface being both spherical.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric. The image-side surface of the third lens element E3 has one inflection point.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The image-side surface of the fourth lens element E4 has one inflection point. The image-side surface of the fourth lens element E4 has one critical point in an off-axis region thereof.

The filter E5 is made of glass material and located between the fourth lens element E4 and the image surface IMG, and will not affect the focal length of the image capturing optical system. The image sensor IS is disposed on or near the image surface IMG of the image capturing optical system.

The detailed optical data of the 8th embodiment are shown in Table 15 and the aspheric surface data are shown in Table 16 below.

TABLE 15

8th Embodiment f = 2.20 mm, Fno = 2.00, HFOV = 75.6 deg.  fd = 2.12 mm

| Surface # | | Curvature Radius | | Thickness | Material | Index | Abbe # | Focal Length | Index | Focal Length |
|---|---|---|---|---|---|---|---|---|---|---|
| 0 | Object | Plano | | Infinity | | | | | | |
| 1 | Lens 1 | 17.5954 | (SPH) | 0.580 | Glass | 1.787 | 46.6 | −2.95 | 1.804 | −2.89 |
| 2 | | 2.0216 | (SPH) | 2.728 | | | | | | |
| 3 | Lens 2 | 2.9007 | (SPH) | 1.401 | Glass | 1.787 | 46.6 | 2.86 | 1.804 | 2.81 |
| 4 | | −7.9635 | (SPH) | −0.025 | | | | | | |
| 5 | Ape. Stop | Plano | | 0.950 | | | | | | |
| 6 | Lens 3 | −1.7552 | (ASP) | 0.665 | Plastic | 1.656 | 18.4 | 28.43 | 1.686 | 26.12 |
| 7 | | −1.8451 | (ASP) | 0.050 | | | | | | |
| 8 | Lens 4 | 26.9078 | (ASP) | 0.840 | Plastic | 1.535 | 56.0 | 13.48 | 1.544 | 13.27 |
| 9 | | −9.7549 | (ASP) | 1.600 | | | | | | |
| 10 | Filter | Plano | | 0.700 | Glass | 1.508 | 64.2 | — | 1.517 | — |
| 11 | | Plano | | 0.761 | | | | | | |
| 12 | Image | Plano | | — | | | | | | |

Note:
Reference wavelength to refractive index and focal length is 940.0 nm.

Note:
Reference wavelength is 587.6 nm (d-line).

TABLE 16

Aspheric Coefficients

| Surface # | 6 | 7 | 8 | 9 |
|---|---|---|---|---|
| k= | −2.59856000E+00 | −6.63990000E+00 | 7.16119000E+01 | 1.99643000E+01 |
| A4= | −7.63731212E−02 | −8.51766656E−02 | 2.58540331E−02 | −7.91180393E−03 |
| A6= | 6.09989301E−02 | 8.71194723E−02 | −1.04011207E−02 | 2.32183972E−03 |
| A8= | −4.54557226E−02 | −5.19451163E−02 | 1.15327143E−03 | 1.35155186E−03 |
| A10= | 3.90851343E−02 | 2.33042651E−02 | 5.62397456E−04 | −9.73310465E−04 |
| A12= | −1.98134777E−02 | −5.16090193E−03 | −1.23625709E−04 | 2.61052461E−04 |
| A14= | 3.78100170E−03 | 3.70382691E−04 | 6.00818009E−06 | −1.84744197E−05 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8thEmbodiment | | | |
|---|---|---|---|
| f [mm] | 2.20 | f/(T12 + T23) | 0.60 |
| Fno | 2.00 | f/(T23 + T34) | 2.25 |
| HFOV [deg.] | 75.6 | f/f2 | 0.77 |
| (N1 + N2)/2 | 1.79 | f/f23 | 0.69 |
| (R3 + R4)/(R3 − R4) | −0.47 | f/R1 | 0.12 |
| (R3 + R5)/(R3 − R5) | 0.25 | f/R3 | 0.76 |
| (R3 + R6)/(R3 − R6) | 0.22 | f/T23 | 2.38 |
| (R7 + R8)/(R7 − R8) | 0.47 | T23/T34 | 18.50 |
| Dr4s/Dr3s | −0.02 | T34/ΣAT | 0.01 |
| Dr5s/Dr6s | 0.59 | TD/CT4 | 8.56 |
| f/(CT2 + CT3) | 1.06 | TD/SL | 1.29 |

9th Embodiment

Figure 17:
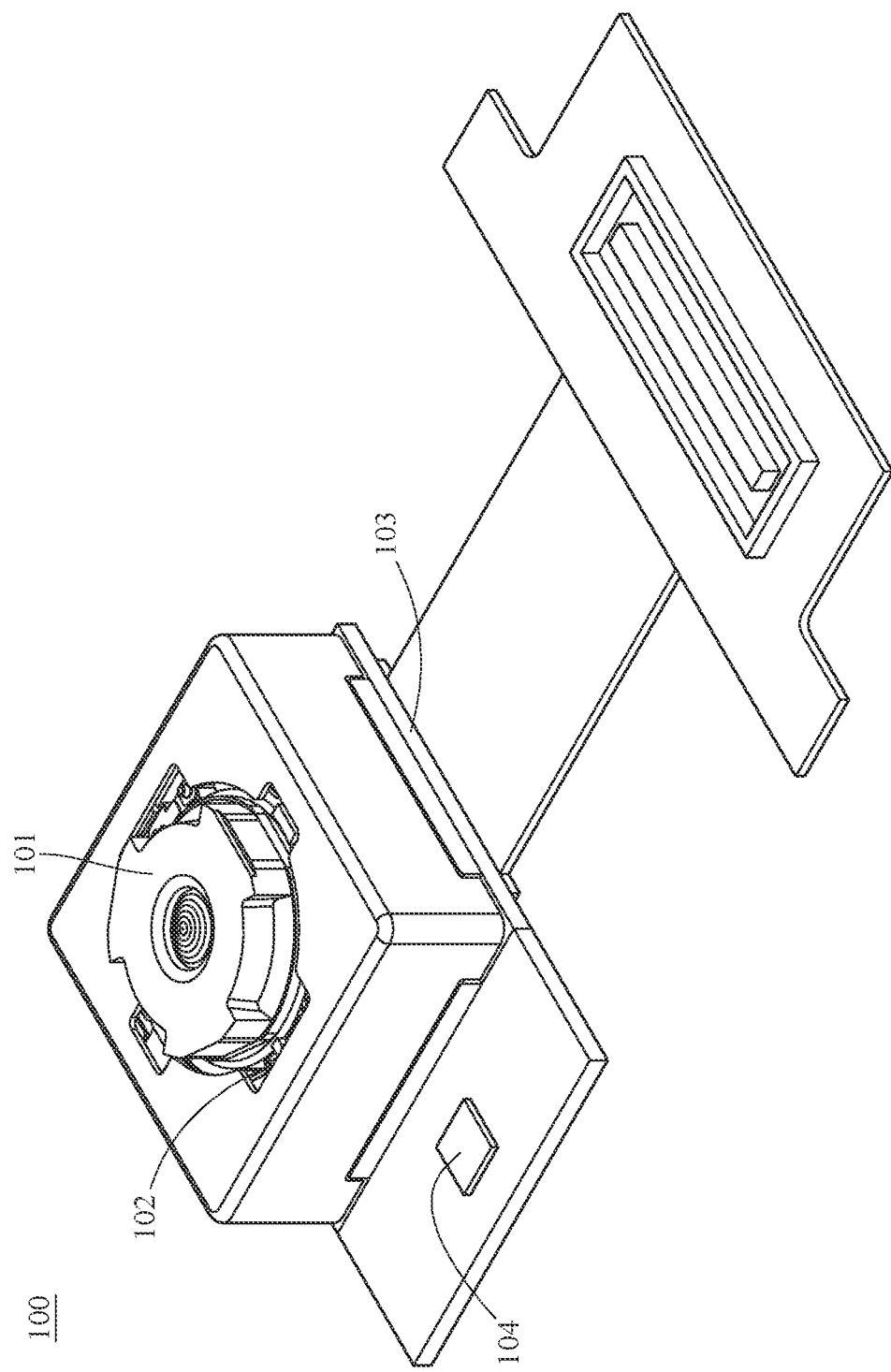
FIG. 17 is a perspective view of an image capturing unit according to the 9th embodiment of the present disclosure.

FIG. 17 is a perspective view of an image capturing unit according to the 9th embodiment of the present disclosure. In this embodiment, an image capturing unit 100 is a camera module including a lens unit 101, a driving device 102, an image sensor 103 and an image stabilizer 104. The lens unit 101 includes the image capturing optical system disclosed in the 1st embodiment, a barrel and a holder member (their reference numerals are omitted) for holding the image capturing optical system. However, the lens unit 101 may alternatively be provided with the image capturing optical system disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, shape memory alloy materials, or liquid lens systems. The driving device 102 is favorable for obtaining a better imaging position of the lens unit 101, so that a clear image of the imaged object can be captured by the lens unit 101 with different object distances or at different ambient temperatures. The image sensor 103 (for example, CCD or CMOS), which can feature high photosensitivity and low noise, is disposed on the image surface of the image capturing optical system to provide higher image quality.

The image stabilizer 104, such as an accelerometer, a gyro sensor and a Hall Effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

10th Embodiment

Figure 18:
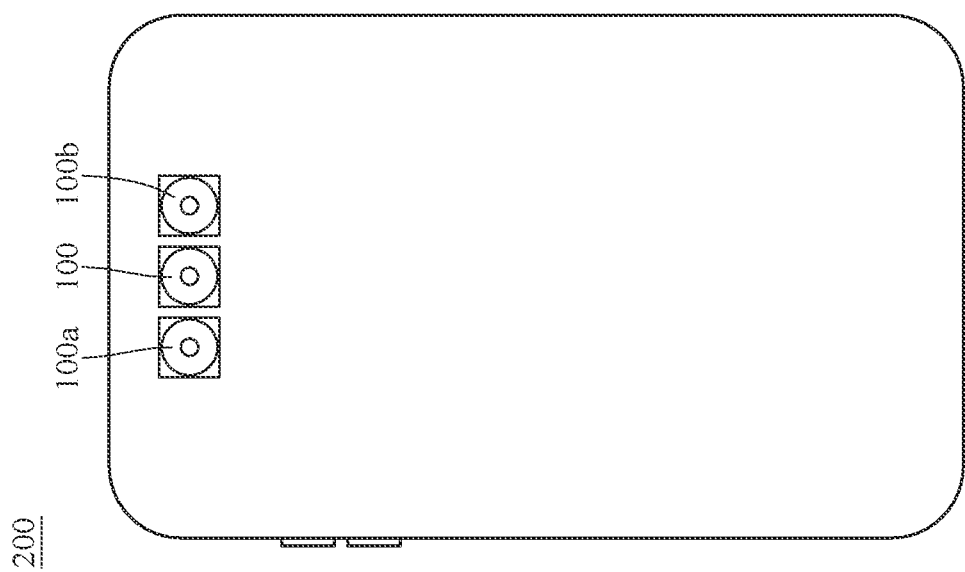
FIG. 18 is one perspective view of an electronic device according to the 10th embodiment of the present disclosure.
Figure 19:
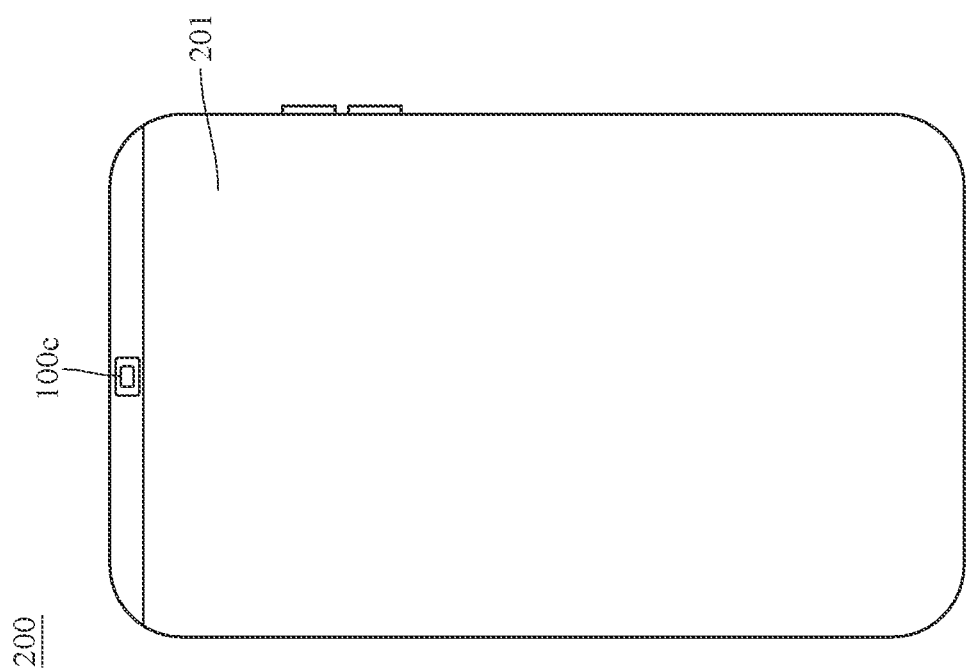
FIG. 19 is another perspective view of the electronic device in FIG. 18.

FIG. 18 is one perspective view of an electronic device according to the 10th embodiment of the present disclosure. FIG. 19 is another perspective view of the electronic device in FIG. 18.

In this embodiment, an electronic device 200 is a smartphone including the image capturing unit 100 disclosed in the 9th embodiment, an image capturing unit 100a, an image capturing unit 100b, an image capturing unit 100c and a display unit 201. As shown in FIG. 18, the image capturing unit 100, the image capturing unit 100a and the image capturing unit 100b are disposed on the same side of the electronic device 200 and face the same side, and each of the image capturing units 100, 100a and 100b has a single focal point. As shown in FIG. 19, the image capturing unit 100c and the display unit 201 are disposed on the opposite side of the electronic device 200, such that the image capturing unit 100c can be a front-facing camera of the electronic device 200 for taking selfies, but the present disclosure is not limited thereto. Furthermore, each of the image capturing units 100a, 100b and 100c can include the image capturing optical system of the present disclosure and can have a configuration similar to that of the image capturing unit 100. In detail, each of the image capturing units 100a, 100b and 100c can include a lens unit, a driving device, an image sensor and an image stabilizer, and each of the lens unit can include an image capturing optical system such as the image capturing optical system of the present disclosure, a barrel and a holder member for holding the image capturing optical system.

The image capturing unit 100 is a wide-angle image capturing unit, the image capturing unit 100a is a telephoto image capturing unit, the image capturing unit 100b is an ultra-wide-angle image capturing unit, and the image capturing unit 100c is a wide-angle image capturing unit. In this embodiment, the image capturing units 100, 100a and 100b have different fields of view, such that the electronic device 200 can have various magnification ratios so as to meet the requirement of optical zoom functionality. Moreover, as shown in FIG. 19, the image capturing unit 100c can have a non-circular opening, and the optical elements in the image capturing unit 100c can have one or more trimmed edges at outer diameter positions thereof for corresponding to the non-circular opening. Therefore, it is favorable for further reducing the size of the image capturing unit 100c, thereby increasing the area ratio of the display unit 201 with respect to the electronic device 200 and reducing the thickness of the electronic device 200. In this embodiment, the electronic device 200 includes multiple image capturing units 100, 100a, 100b and 100c, but the present disclosure is not limited to the number and arrangement of image capturing units.

11th Embodiment

Figure 20:
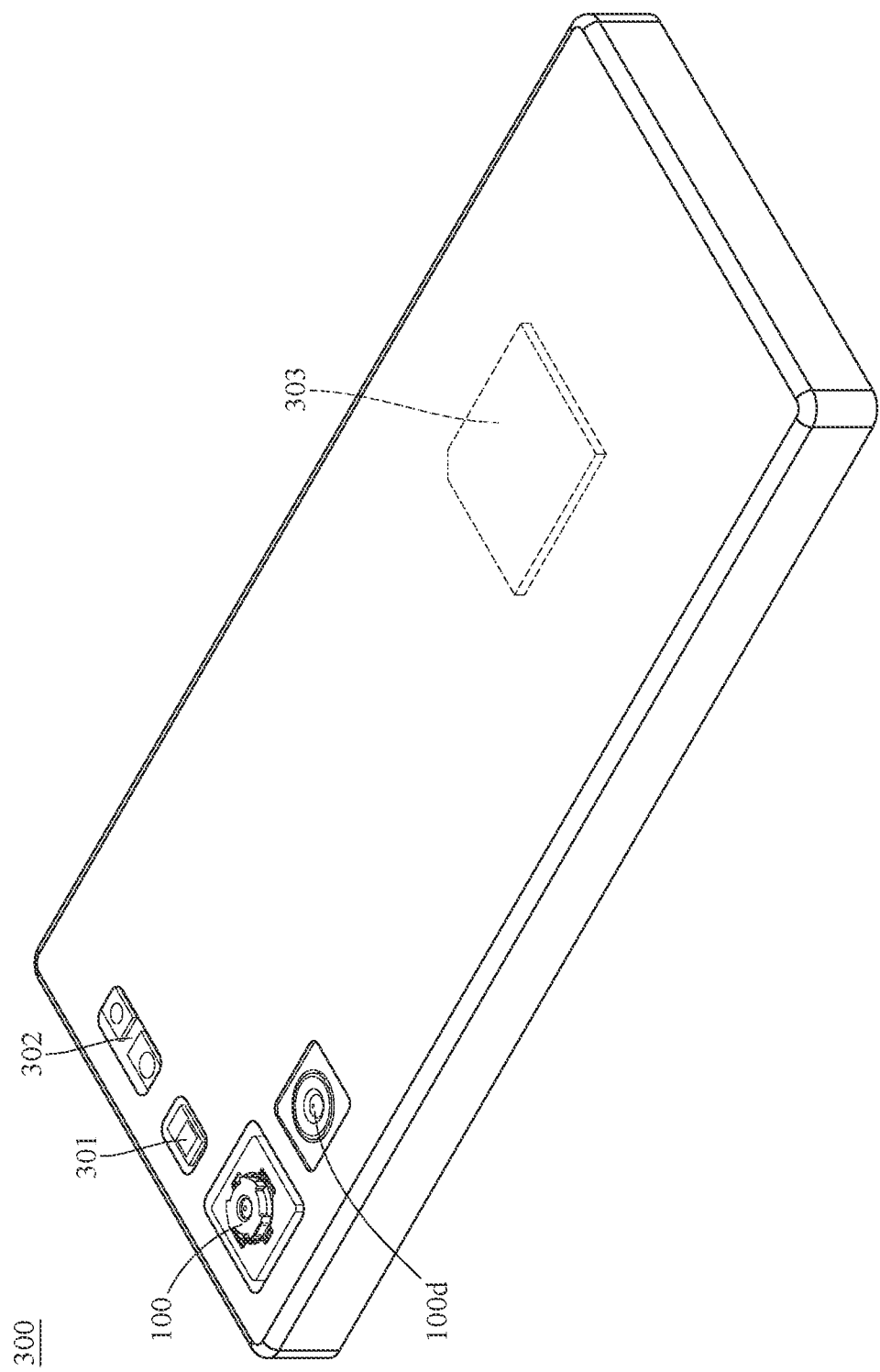
FIG. 20 is one perspective view of an electronic device according to the 11th embodiment of the present disclosure.
Figure 21:
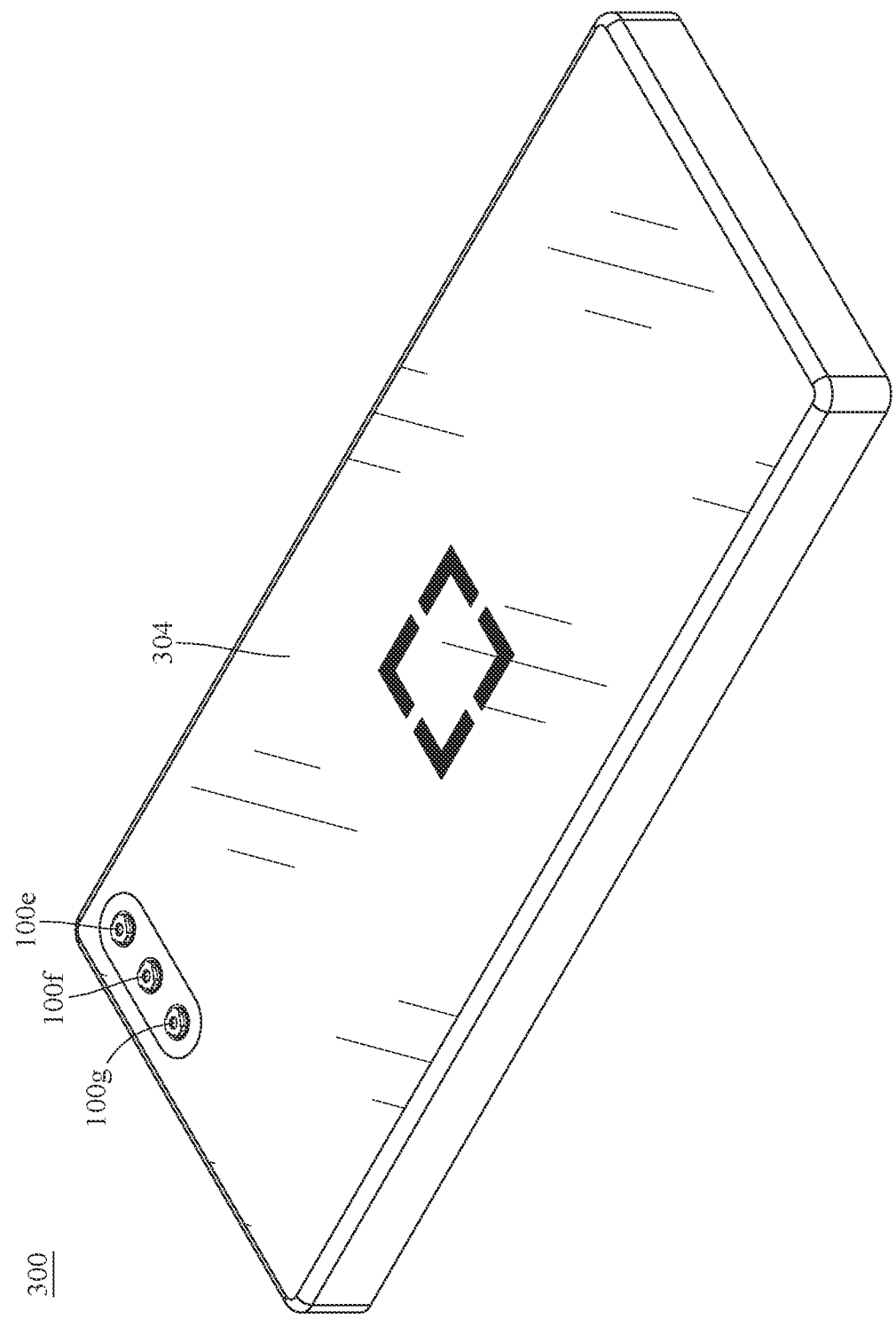
FIG. 21 is another perspective view of the electronic device in FIG. 20.
Figure 22:
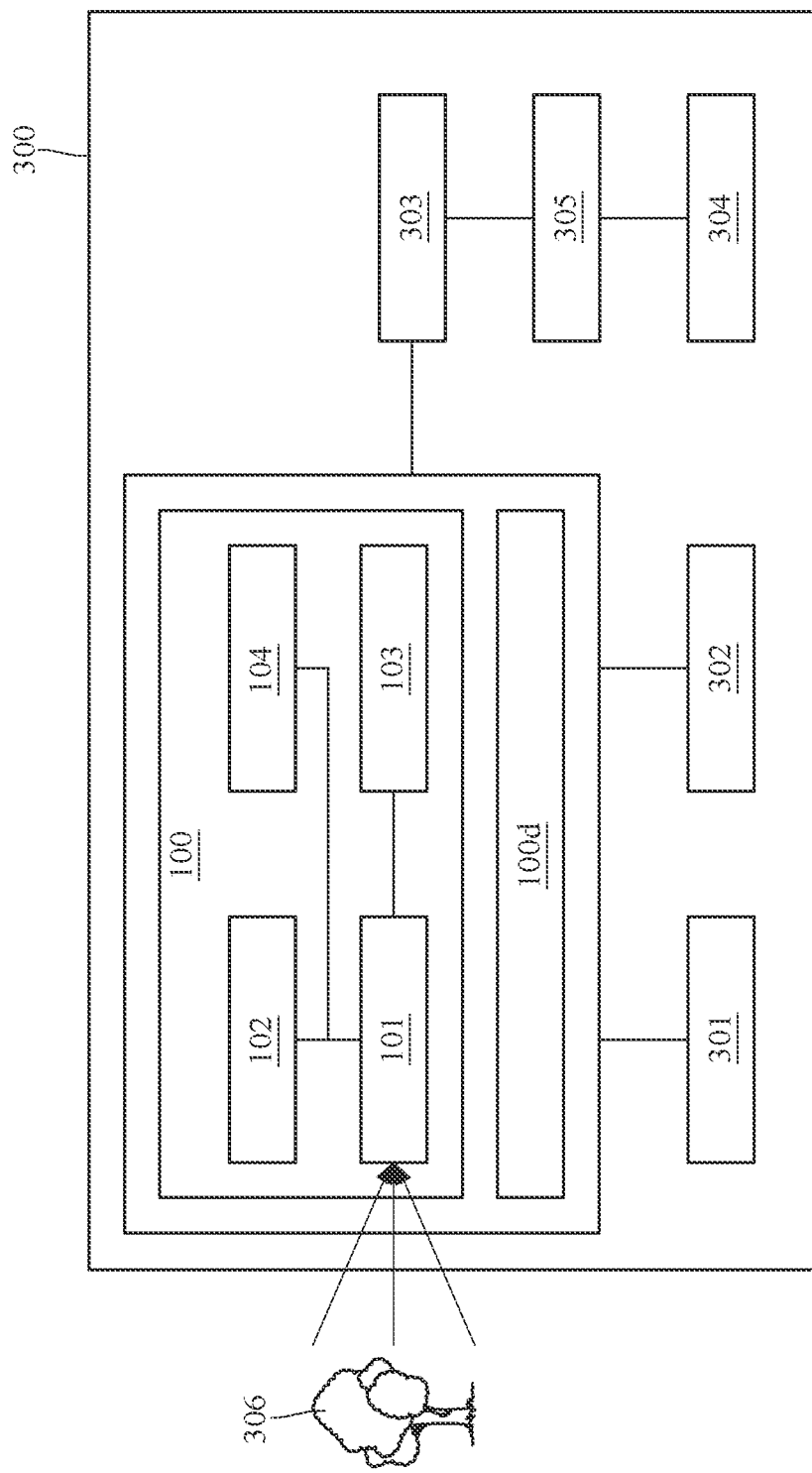
FIG. 22 is a block diagram of the electronic device in FIG. 20.

FIG. 20 is one perspective view of an electronic device according to the 11th embodiment of the present disclosure. FIG. 21 is another perspective view of the electronic device in FIG. 20. FIG. 22 is a block diagram of the electronic device in FIG. 20.

In this embodiment, an electronic device 300 is a smartphone including the image capturing unit 100 disclosed in the 9th embodiment, an image capturing unit 100d, an image capturing unit 100e, an image capturing unit 100f, an image capturing unit 100g, a flash module 301, a focus assist module 302, an image signal processor 303, a display module 304 and an image software processor 305. The image capturing unit 100 and the image capturing unit 100d are disposed on the same side of the electronic device 300. The focus assist module 302 can be a laser rangefinder or a ToF (time of flight) module, but the present disclosure is not limited thereto. The image capturing unit 100e, the image capturing unit 100f, the image capturing unit 100g and the display module 304 are disposed on the opposite side of the electronic device 300, and the display module 304 can be a user interface, such that the image capturing units 100e, 100f, 100g can be front-facing cameras of the electronic device 300 for taking selfies, but the present disclosure is not limited thereto. Furthermore, each of the image capturing units 100d, 100e, 100f and 100g can include the image capturing optical system of the present disclosure and can have a configuration similar to that of the image capturing unit 100. In detail, each of the image capturing units 100d, 100e, 100f and 100g can include a lens unit, a driving device, an image sensor and an image stabilizer, and each of the lens unit can include an image capturing optical system such as the image capturing optical system of the present disclosure, a barrel and a holder member for holding the image capturing optical system.

The image capturing unit 100 is a wide-angle image capturing unit, the image capturing unit 100d is an ultra-wide-angle image capturing unit, the image capturing unit 100e is a wide-angle image capturing unit, the image capturing unit 100f is an ultra-wide-angle image capturing unit, and the image capturing unit 100g is a ToF image capturing unit. In this embodiment, the image capturing units 100, 100d, 100e and 100f have different fields of view, such that the electronic device 300 can have various magnification ratios so as to meet the requirement of optical zoom functionality. In addition, the image capturing unit 100g can determine depth information of the imaged object. In this embodiment, the electronic device 300 includes multiple image capturing units 100, 100d, 100e, 100f and 100g, but the present disclosure is not limited to the number and arrangement of image capturing units.

When a user captures images of an object 306, the light rays converge in the image capturing unit 100 or the image capturing unit 100d to generate images, and the flash module 301 is activated for light supplement. The focus assist module 302 detects the object distance of the imaged object 306 to achieve fast auto focusing. The image signal processor 303 is configured to optimize the captured image to improve image quality. The light beam emitted from the focus assist module 302 can be either conventional infrared or laser. In addition, the light rays may converge in the image capturing unit 100e, 100f or 100g to generate images. The display module 304 can include a touch screen, and the user is able to interact with the display module 304 and the image software processor 305 having multiple functions to capture images and complete image processing. Alternatively, the user may capture images via a physical button. The image processed by the image software processor 305 can be displayed on the display module 304.

12th Embodiment

Figure 23:
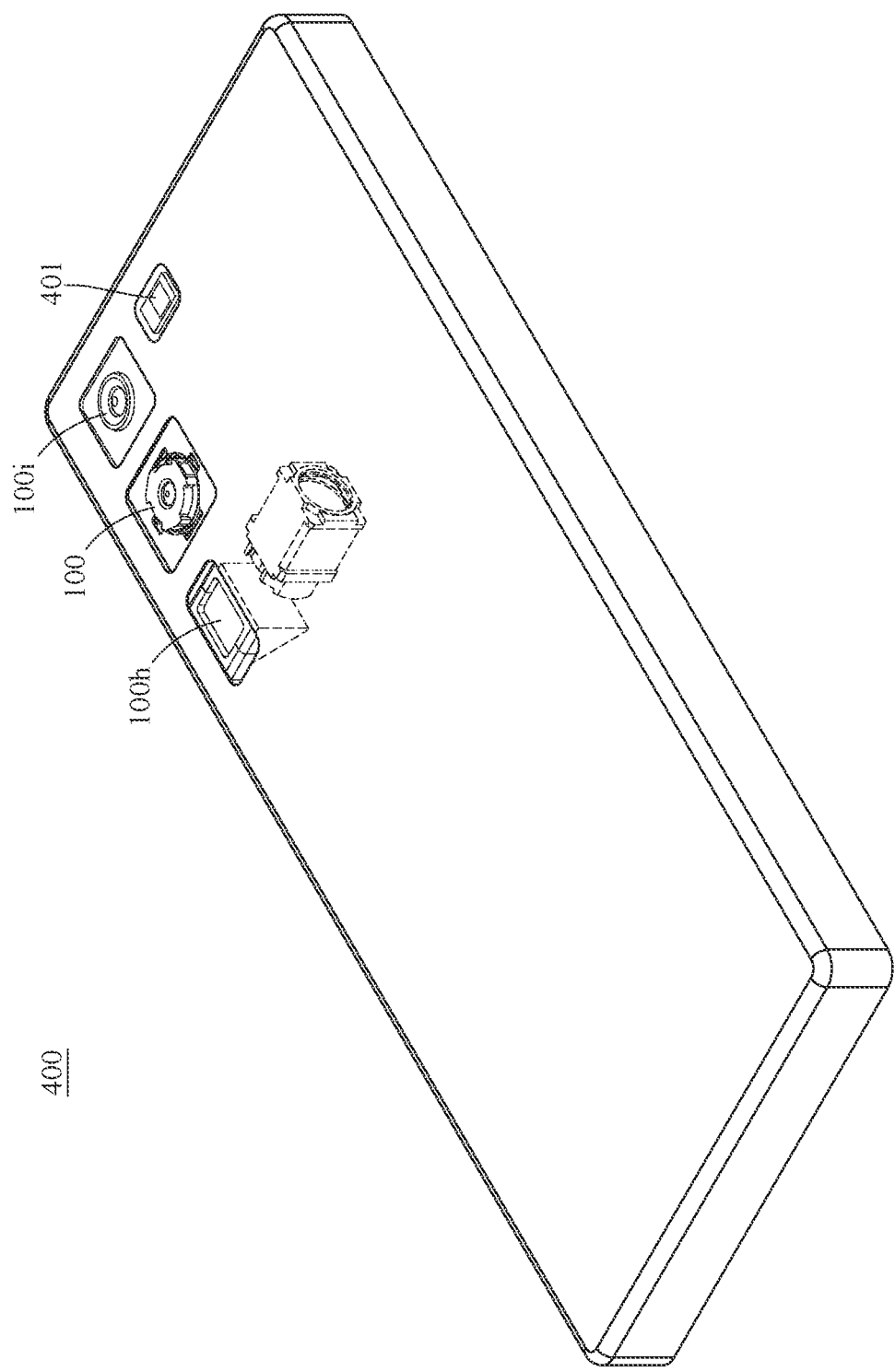
FIG. 23 is one perspective view of an electronic device according to the 12th embodiment of the present disclosure.

FIG. 23 is one perspective view of an electronic device according to the 12th embodiment of the present disclosure.

In this embodiment, an electronic device 400 is a smartphone including the image capturing unit 100 disclosed in the 9th embodiment, an image capturing unit 100h, an image capturing unit 100i, a flash module 401, a focus assist module, an image signal processor, a display module and an image software processor (not shown). The image capturing unit 100, the image capturing unit 100h and the image capturing unit 100i are disposed on the same side of the electronic device 400, while the display module is disposed on the opposite side of the electronic device 400. Furthermore, each of the image capturing units 100h and 100i can include the image capturing optical system of the present disclosure and can have a configuration similar to that of the image capturing unit 100, and the details in this regard will not be provided again.

The image capturing unit 100 is a wide-angle image capturing unit, the image capturing unit 100h is a telephoto image capturing unit, and the image capturing unit 100i is an ultra-wide-angle image capturing unit. In this embodiment, the image capturing units 100, 100h and 100i have different fields of view, such that the electronic device 400 can have various magnification ratios so as to meet the requirement of optical zoom functionality. Moreover, the image capturing unit 100h can be a telephoto image capturing unit having a light-folding element configuration, such that the total track length of the image capturing unit 100h is not limited by the thickness of the electronic device 400. Moreover, the light-folding element configuration of the image capturing unit 100h can be similar to, for example, one of the structures shown in FIG. 30 to FIG. 32, which can be referred to foregoing descriptions corresponding to FIG. 30 to FIG. 32, and the details in this regard will not be provided again. In this embodiment, the electronic device 400 includes multiple image capturing units 100, 100h and 100i, but the present disclosure is not limited to the number and arrangement of image capturing units. When a user captures images of an object, light rays converge in the image capturing unit 100, 100h or 100i to generate images, and the flash module 401 is activated for light supplement. Further, the subsequent processes are performed in a manner similar to the abovementioned embodiment, so the details in this regard will not be provided again.

13th Embodiment

Figure 24:
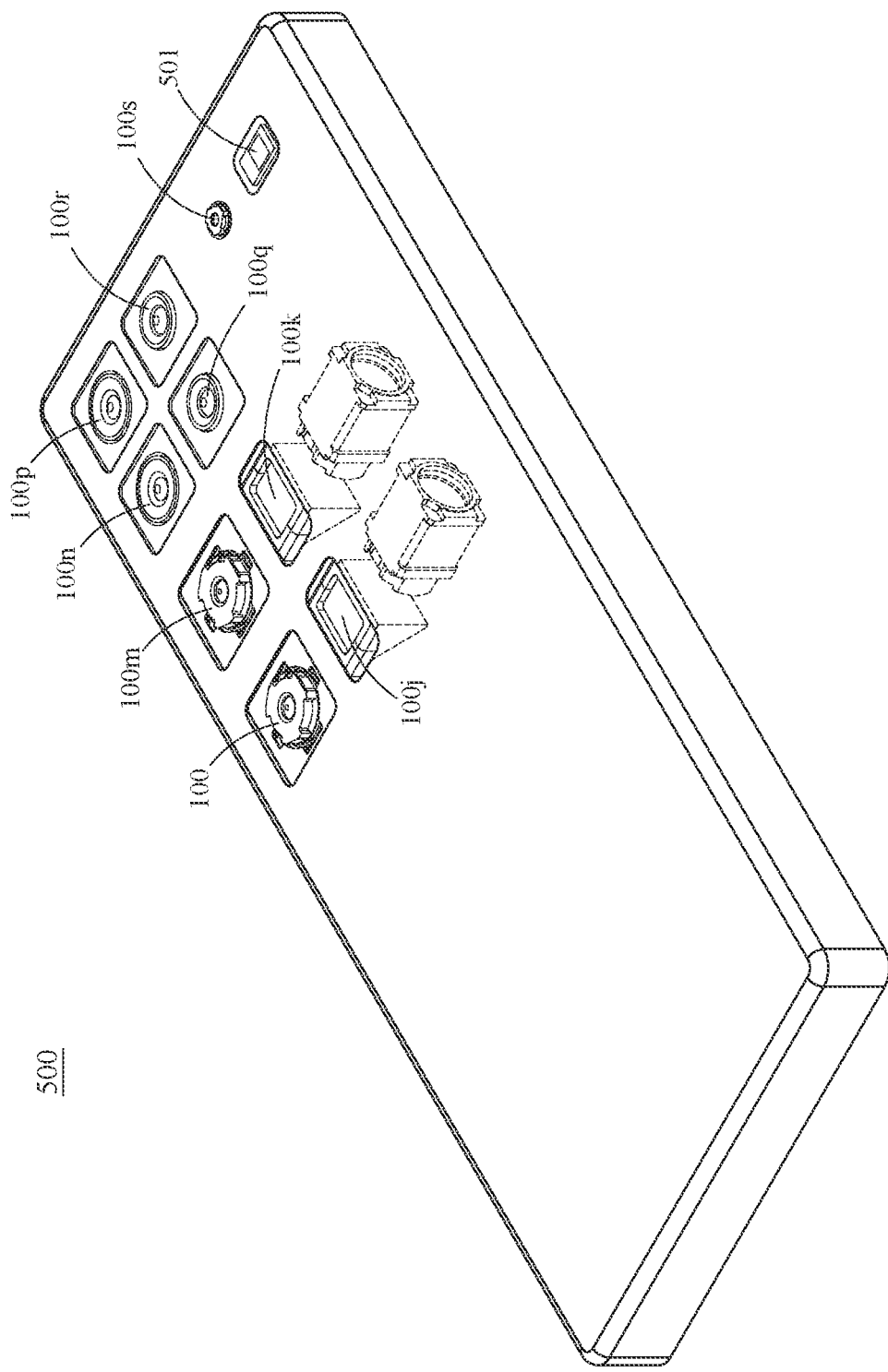
FIG. 24 is one perspective view of an electronic device according to the 13th embodiment of the present disclosure.

FIG. 24 is one perspective view of an electronic device according to the 13th embodiment of the present disclosure.

In this embodiment, an electronic device 500 is a smartphone including the image capturing unit 100 disclosed in the 9th embodiment, an image capturing unit 100j, an image capturing unit 100k, an image capturing unit 100m, an image capturing unit 100n, an image capturing unit 100p, an image capturing unit 100q, an image capturing unit 100r, an image capturing unit 100s, a flash module 501, a focus assist module, an image signal processor, a display module and an image software processor (not shown). The image capturing units 100, 100j, 100k, 100m, 100n, 100p, 100q, 100r and 100s are disposed on the same side of the electronic device 500, while the display module is disposed on the opposite side of the electronic device 500. Furthermore, each of the image capturing units 100j, 100k, 100m, 100n, 100p, 100q, 100r and 100s can include the image capturing optical system of the present disclosure and can have a configuration similar to that of the image capturing unit 100, and the details in this regard will not be provided again.

The image capturing unit 100 is a wide-angle image capturing unit, the image capturing unit 100j is a telephoto image capturing unit, the image capturing unit 100k is a telephoto image capturing unit, the image capturing unit 100m is a wide-angle image capturing unit, the image capturing unit 100n is an ultra-wide-angle image capturing unit, the image capturing unit 100p is an ultra-wide-angle image capturing unit, the image capturing unit 100q is a telephoto image capturing unit, the image capturing unit 100r is a telephoto image capturing unit, and the image capturing unit 100s is a ToF image capturing unit. In this embodiment, the image capturing units 100, 100j, 100k, 100m, 100n, 100p, 100q and 100r have different fields of view, such that the electronic device 500 can have various magnification ratios so as to meet the requirement of optical zoom functionality. Moreover, each of the image capturing units 100j and 100k can be a telephoto image capturing unit having a light-folding element configuration. Moreover, the light-folding element configuration of each of the image capturing unit 100j and 100k can be similar to, for example, one of the structures shown in FIG. 30 to FIG. 32, which can be referred to foregoing descriptions corresponding to FIG. 30 to FIG. 32, and the details in this regard will not be provided again. In addition, the image capturing unit 100s can determine depth information of the imaged object. In this embodiment, the electronic device 500 includes multiple image capturing units 100, 100j, 100k, 100m, 100n, 100p, 100q, 100r and 100s, but the present disclosure is not limited to the number and arrangement of image capturing units. When a user captures images of an object, the light rays converge in the image capturing unit 100, 100j, 100k, 100m, 100n, 100p, 100q, 100r or 100s to generate images, and the flash module 501 is activated for light supplement. Further, the subsequent processes are performed in a manner similar to the abovementioned embodiments, and the details in this regard will not be provided again.

14th Embodiment

Figure 25:
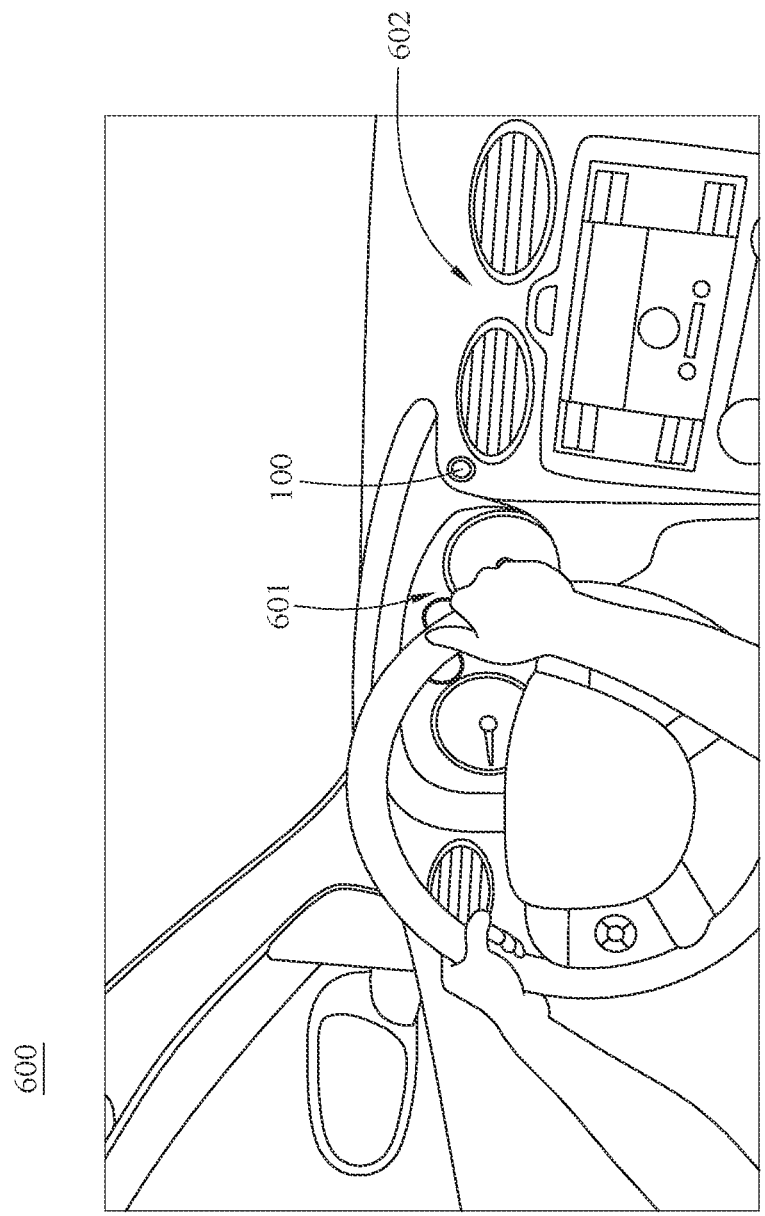
FIG. 25 is a partial view of an inner side of a vehicle device according to the 14th embodiment of the present disclosure.

FIG. 25 is a partial view of an inner side of a vehicle device according to the 14th embodiment of the present disclosure.

Figure 26:
FIG. 26 is a schematic view showing the image captured by the image capturing unit of the vehicle device in FIG. 25 when processing its detection function.

In this embodiment, the vehicle device 600 is an automobile. The vehicle device 600 includes the image capturing unit 100 disclosed in the 9th embodiment. The image capturing unit 100 is disposed adjacent to the dashboard 601 or center console 602 of the vehicle device 600, but the present disclosure is not limited thereto. The image capturing unit 100 can be used as a sensing lens towards the driver for being applied in a driver monitoring system, thereby detecting the driver's sobriety by determining the driver's gaze and blink or checking the driver's yawn and head position through the infrared lens. The image detected by the image capturing unit 100 can refer to FIG. 26, which is a schematic view showing the image captured by the image capturing unit of the vehicle device in FIG. 25 when processing its detection function. Therefore, it is favorable for detecting whether the driver is distracted, tired, dozing off or other dangerous driving, thereby sending a signal to the reminder or alarm (not shown) in the vehicle device 600 or a management system (not shown) in communication connection with the vehicle device 600.

15th Embodiment

Figure 27:
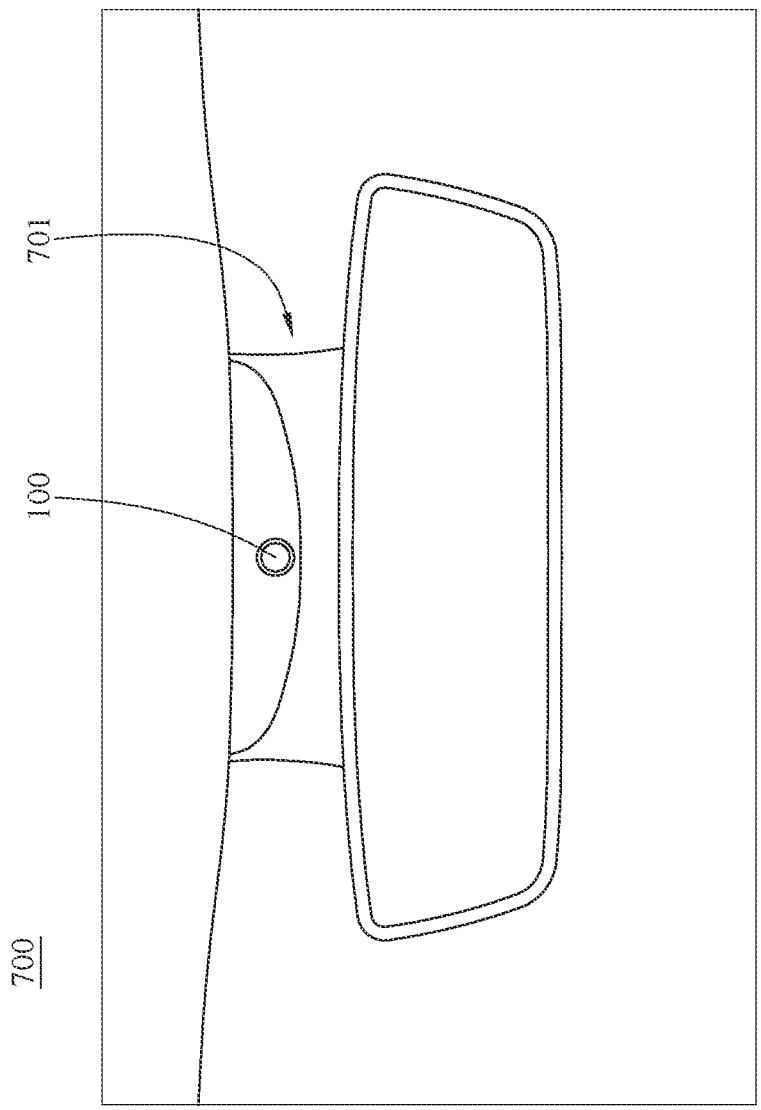
FIG. 27 is a partial view of an inner side of a vehicle device according to the 15th embodiment of the present disclosure.

FIG. 27 is a partial view of an inner side of a vehicle device according to the 15th embodiment of the present disclosure.

Figure 28:
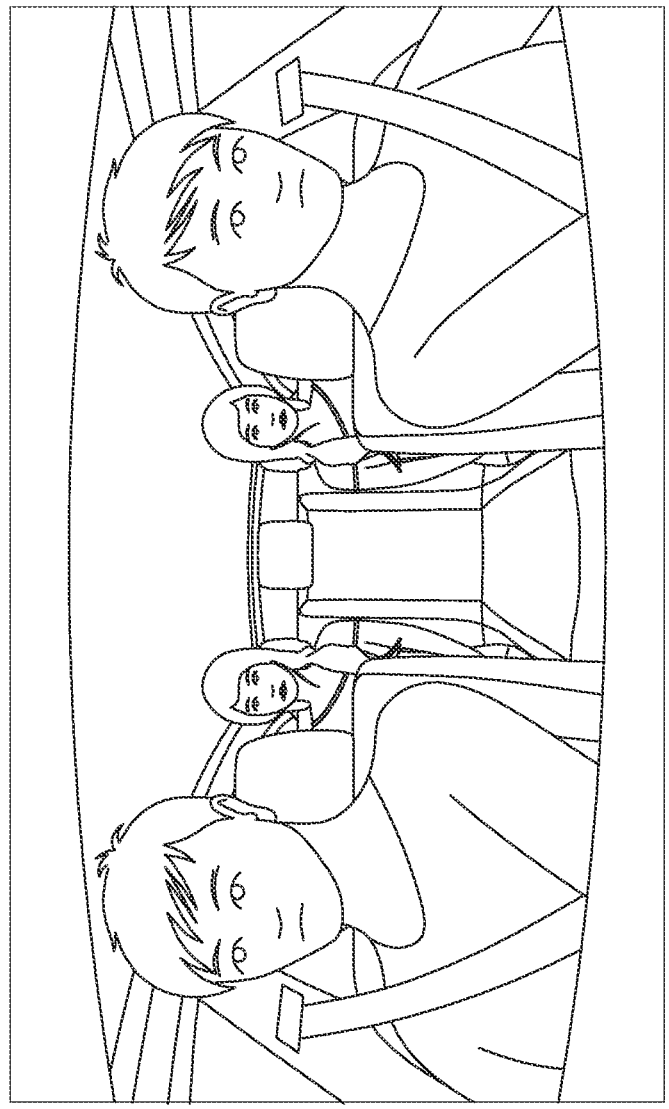
FIG. 28 is a schematic view showing the image captured by the image capturing unit of the vehicle device in FIG. 27 when processing its detection function.

In this embodiment, the vehicle device 700 is an automobile. The vehicle device 700 includes the image capturing unit 100 disclosed in the 9th embodiment. The image capturing unit 100 is disposed adjacent to the rear-view mirror 701 or center console of the vehicle device 700, but the present disclosure is not limited thereto. The image capturing unit 100 can be used as a sensing lens towards the inner side of the vehicle device 700. The image detected by the image capturing unit 100 can refer to FIG. 28, which is a schematic view showing the image captured by the image capturing unit of the vehicle device in FIG. 27 when processing its detection function. Therefore, it is favorable for detecting the states of the people in the vehicle device 700 (may include the driver and passengers), such as the driver's sobriety, the passenger's gender, whether the seat belt is fastened, whether conflict is happened between the driver and passengers, or other situation affecting normal driving, thereby sending a signal to the storage device (not shown) in the vehicle device 700 or a management system (not shown) in communication connection with the vehicle device 700.

Furthermore, the electronic device or the vehicle device according to the present disclosure can further include a temperature sensor (not shown) disposed adjacent to the image capturing unit for adjusting the focus of the lens based on the ambient temperature. Alternatively, the electronic device or the vehicle device according to the present disclosure can further include a heat dissipation mechanism disposed on the image capturing unit for preventing poor image quality due to the overheated image capturing unit. Note that the abovementioned heat dissipation mechanism can be a coating layer of high heat dissipation material such as diamond like carbon or graphene, and the abovementioned heat dissipation mechanism can also be designed to have microstructure with a high heat dissipation area so as to effectively enhance the heat dissipation effect.

The smartphone or vehicle in this embodiment is only exemplary for showing the image capturing unit of the present disclosure installed in an electronic device, and the present disclosure is not limited thereto. The image capturing unit can be optionally applied to optical systems with a movable focus. Furthermore, the image capturing optical system of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multicamera devices, image recognition systems, motion sensing input devices, wearable devices and other electronic imaging devices.

The foregoing description, for the purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing optical system comprising four lens elements, the four lens elements being, in order from an object side to an image side along an optical path, a first lens element, a second lens element, a third lens element and a fourth lens element, and each of the four lens elements having an object-side surface facing toward the object side and an image-side surface facing toward the image side;

wherein the first lens element has negative refractive power, the image-side surface of the first lens element is concave in a paraxial region thereof, the second lens element has positive refractive power, the third lens element has positive refractive power, the object-side surface of the third lens element is concave in a paraxial region thereof, the image-side surface of the third lens element is convex in a paraxial region thereof, the fourth lens element has negative refractive power, the object-side surface of the fourth lens element is convex in a paraxial region thereof, the image-side surface of the fourth lens element is concave in a paraxial region thereof, there is an air gap in a paraxial region between the second lens element and the third lens element, and the image capturing optical system further comprises an aperture stop located between the second lens element and the third lens element;

wherein a curvature radius of the object-side surface of the second lens element is R3, a curvature radius of the image-side surface of the second lens element is R4, a focal length of the image capturing optical system is f, a central thickness of the second lens element is CT2, a central thickness of the third lens element is CT3, an axial distance between the second lens element and the third lens element is T23, an axial distance between the third lens element and the fourth lens element is T34, and the following conditions are satisfied:

$-1.65 < (R3+R4)/(R3-R4)$;

$0.60 < f/(CT2+CT3) < 2.50$; and $11.0 < T23/T34 \leq 30.08$.

2. The image capturing optical system of claim 1, wherein the axial distance between the third lens element and the fourth lens element is T34, a sum of axial distances between each of all adjacent lens elements of the image capturing optical system is ΣAT, and the following condition is satisfied:

$0 < T34/\Sigma AT < 0.10$.

3. The image capturing optical system of claim 1, wherein the curvature radius of the object-side surface of the second lens element is R3, a curvature radius of the object-side surface of the third lens element is R5, and the following condition is satisfied:

$-0.38 < (R3+R5)/(R3-R5) < 0.27$.

4. The image capturing optical system of claim 1, wherein the focal length of the image capturing optical system is f, a focal length of the second lens element is f2, and the following condition is satisfied:

$0.65 < f/f2 < 2.00$.

5. The image capturing optical system of claim 1, wherein the focal length of the image capturing optical system is f, the curvature radius of the object-side surface of the second lens element is R3, and the following condition is satisfied:

$0.70 < f/R3 < 2.00$.

6. The image capturing optical system of claim 1, wherein the curvature radius of the object-side surface of the second lens element is R3, a curvature radius of the image-side surface of the third lens element is R6, an f-number of the image capturing optical system is Fno, and the following conditions are satisfied:

$0.10 < (R3+R6)/(R3-R6) < 0.65$; and $1.50 < Fno < 2.40$.

7. The image capturing optical system of claim 1, wherein at least one of the object-side surface and the image-side surface of the fourth lens element has at least one inflection point, an axial distance between the object-side surface of the first lens element and the image-side surface of the fourth lens element is TD, an axial distance between the aperture stop and an image surface is SL, the focal length of the image capturing optical system is f, the axial distance between the second lens element and the third lens element is T23, and the following conditions are satisfied:

$0.60 < TD/SL < 1.30$; and $2.50 < f/T23 < 15.0$.

8. The image capturing optical system of claim 1, wherein an axial distance between the object-side surface of the second lens element and the aperture stop is Dr3s, an axial distance between the image-side surface of the second lens element and the aperture stop is Dr4s, an axial distance between the object-side surface of the third lens element and the aperture stop is Dr5s, an axial distance between the image-side surface of the third lens element and the aperture stop is Dr6s, and the following conditions are satisfied:

$-0.80 < Dr4s/Dr3s < 1.00$; and $-0.80 < Dr5s/Dr6s < 1.00$.

9. An image capturing unit, comprising:
the image capturing optical system of claim 1; and
an image sensor disposed on an image surface of the image capturing optical system.

10. An electronic device, comprising:
the image capturing unit of claim 9.

11. An image capturing optical system comprising four lens elements, the four lens elements being, in order from an object side to an image side along an optical path, a first lens element, a second lens element, a third lens element and a fourth lens element, and each of the four lens elements having an object-side surface facing toward the object side and an image-side surface facing toward the image side;

wherein the first lens element has negative refractive power, the image-side surface of the first lens element is concave in a paraxial region thereof, the second lens element has positive refractive power, the third lens element has positive refractive power, the object-side surface of the third lens element is concave in a paraxial region thereof, the image-side surface of the third lens element is convex in a paraxial region thereof, the fourth lens element has negative refractive power, the object-side surface of the fourth lens element is convex in a paraxial region thereof, the image-side surface of the fourth lens element is concave in a paraxial region thereof, at least one of the object-side surface and the image-side surface of the fourth lens element has at least one inflection point, there is an air gap in a paraxial region between the second lens element and the third lens element, and the image capturing optical system further comprises an aperture stop located between the second lens element and the third lens element;

wherein a curvature radius of the object-side surface of the second lens element is R3, a curvature radius of the image-side surface of the second lens element is R4, an axial distance between the second lens element and the third lens element is T23, an axial distance between the third lens element and the fourth lens element is T34, and the following conditions are satisfied:

$-1.40<(R3+R4)/(R3-R4)<0.80$; and $11.0<T23/T34\leq30.08$.

12. The image capturing optical system of claim 11, wherein an axial distance between the object-side surface of the first lens element and the image-side surface of the fourth lens element is TD, an axial distance between the aperture stop and an image surface is SL, a focal length of the image capturing optical system is f, the axial distance between the second lens element and the third lens element is T23, and the following conditions are satisfied:

$0.40<TD/SL<1.50$; and $2.50<f/T23<15.0$.

13. The image capturing optical system of claim 11, wherein a focal length of the image capturing optical system is f, a focal length of the second lens element is f2, and the following condition is satisfied:

$0.65<f/f2<2.00$.

14. The image capturing optical system of claim 11, wherein a focal length of the image capturing optical system is f, a composite focal length of the second lens element and the third lens element is f23, an f-number of the image capturing optical system is Fno, and the following conditions are satisfied:

$0.60<f/f23<1.80$; and $1.50<Fno<2.30$.

15. The image capturing optical system of claim 11, wherein a focal length of the image capturing optical system is f, a curvature radius of the object-side surface of the first lens element is R1, and the following condition is satisfied:

$-0.30<f/R1<0.50$.

16. The image capturing optical system of claim 11, wherein the axial distance between the second lens element and the third lens element is T23, the axial distance between the third lens element and the fourth lens element is T34, and the following condition is satisfied:

$11.0<T23/T34<19.0$.

17. The image capturing optical system of claim 11, wherein the curvature radius of the object-side surface of the second lens element is R3, a curvature radius of the object-side surface of the third lens element is R5, and the following condition is satisfied:

$-0.38<(R3+R5)/(R3-R5)<0.27$.

18. The image capturing optical system of claim 11, wherein an axial distance between the object-side surface of the first lens element and the image-side surface of the fourth lens element is TD, a central thickness of the fourth lens element is CT4, and the following condition is satisfied:

$6.50<TD/CT4<20.0$.

19. An image capturing optical system comprising four lens elements, the four lens elements being, in order from an object side to an image side along an optical path, a first lens element, a second lens element, a third lens element and a fourth lens element, and each of the four lens elements having an object-side surface facing toward the object side and an image-side surface facing toward the image side;

wherein the first lens element has negative refractive power, the image-side surface of the first lens element is concave in a paraxial region thereof, the second lens element has positive refractive power, the third lens element has positive refractive power, the object-side surface of the third lens element is concave in a paraxial region thereof, the image-side surface of the third lens element is convex in a paraxial region thereof, and the image capturing optical system further comprises an aperture stop located between the second lens element and the third lens element;

wherein a curvature radius of the object-side surface of the second lens element is R3, a curvature radius of the image-side surface of the second lens element is R4, a curvature radius of the object-side surface of the fourth lens element is R7, a curvature radius of the image-side surface of the fourth lens element is R8, a focal length of the image capturing optical system is f, a central thickness of the second lens element is CT2, a central thickness of the third lens element is CT3, a central thickness of the fourth lens element is CT4, an f-number of the image capturing optical system is Fno, an axial distance between the object-side surface of the first lens element and the image-side surface of the fourth lens element is TD, an axial distance between the second lens element and the third lens element is T23, an axial distance between the third lens element and the fourth lens element is T34, and the following conditions are satisfied:

$-2.40<(R3+R4)/(R3-R4)<15.0$;

$-0.85<(R7+R8)/(R7-R8)$;

$0.60<f/(CT2+CT3)<1.52$;

$-1.40<Fno<2.50$;

$5.00<TD/CT4<22.0$; and $11.0<T23/T34\leq30.08$.

20. The image capturing optical system of claim 19, wherein the axial distance between the third lens element and the fourth lens element is T34, a sum of axial distances between each of all adjacent lens elements of the image capturing optical system is ΣAT, and the following condition is satisfied:

0<*T*34/Σ*AT*<0.10.

21. The image capturing optical system of claim 19, wherein the focal length of the image capturing optical system is f, the axial distance between the second lens element and the third lens element is T23, the axial distance between the third lens element and the fourth lens element is T34, a focal length of the second lens element is f2, and the following conditions are satisfied:

2.00<*f*/(*T*23+*T*34)<6.20; and 0.65<*f*/*f*2<2.50.

22. The image capturing optical system of claim 19, wherein the focal length of the image capturing optical system is f, the curvature radius of the object-side surface of the second lens element is R3, and the following condition is satisfied:

0.70<*f*/*R*3<2.00.

23. The image capturing optical system of claim 19, wherein the axial distance between the second lens element and the third lens element is T23, the axial distance between the third lens element and the fourth lens element is T34, and the following condition is satisfied:

11.0<*T*23/*T*34<19.0.

24. The image capturing optical system of claim 19, wherein the object-side surface of the fourth lens element is convex in a paraxial region thereof, the image-side surface of the fourth lens element is concave in a paraxial region thereof, at least one of the object-side surface and the image-side surface of the fourth lens element has at least one inflection point, the f-number of the image capturing optical system is Fno, and the following condition is satisfied:

1.60<*Fno*<2.25.

25. The image capturing optical system of claim 19, wherein a refractive index of the first lens element is N1, a refractive index of the second lens element is N2, and the following condition is satisfied:

1.63<(*N*1+*N*2)/2<1.83.

26. The image capturing optical system of claim 19, wherein the focal length of the image capturing optical system is f, an axial distance between the first lens element and the second lens element is T12, the axial distance between the second lens element and the third lens element is T23, and the following condition is satisfied:

0.55<*f*/(*T*12+*T*23)<2.85.

27. The image capturing optical system of claim 19, wherein an axial distance between the object-side surface of the second lens element and the aperture stop is Dr3s, an axial distance between the image-side surface of the second lens element and the aperture stop is Dr4s, an axial distance between the object-side surface of the third lens element and the aperture stop is Dr5s, an axial distance between the image-side surface of the third lens element and the aperture stop is Dr6s, and the following conditions are satisfied:

-0.80<*Dr*4*s*/*Dr*3*s*<1.00; and

-0.80<*Dr*5*s*/*Dr*6*s*<1.00.

* * * * *